US011472660B1

(12) United States Patent
DeBellis

(10) Patent No.: US 11,472,660 B1
(45) Date of Patent: Oct. 18, 2022

(54) SYSTEM AND APPARATUS FOR DRILL POWERED HANDHELD LINE PULLING

(71) Applicant: Tommy D Electrical Products, LLC, Canyon Lake, CA (US)

(72) Inventor: Thomas DeBellis, Canyon Lake, CA (US)

(73) Assignee: Tommy D Electrical Products LLC, Canyon Lake, CA (US)

(*) Notice: Subject to any disclaimer, the term of this patent is extended or adjusted under 35 U.S.C. 154(b) by 222 days.

(21) Appl. No.: 16/733,043

(22) Filed: Jan. 2, 2020

Related U.S. Application Data

(63) Continuation of application No. 16/417,405, filed on May 20, 2019, which is a continuation of application No. 16/119,885, filed on Aug. 31, 2018, now Pat. No. 10,294,067, which is a continuation-in-part of application No. 16/102,591, filed on Aug. 13, 2018, now Pat. No. 11,139,643, which is a continuation of application No. 29/603,787, filed on May 12, 2017, now Pat. No. Des. 842,063.

(51) Int. Cl.
*B65H 75/30* (2006.01)
*B65H 75/40* (2006.01)

(52) U.S. Cl.
CPC ......... *B65H 75/305* (2013.01); *B65H 75/406* (2013.01); *B65H 2402/412* (2013.01); *B65H 2701/36* (2013.01)

(58) Field of Classification Search
CPC .............. B65H 75/305; B65H 75/406; B65H 2402/412; B65H 2701/36
See application file for complete search history.

(56) References Cited

U.S. PATENT DOCUMENTS

| | | |
|---|---|---|
| 2,286,815 A | 6/1942 | Kiersted |
| D152,067 S | 12/1948 | Curtis |
| 2,489,319 A | 11/1949 | Nave, Jr. et al. |
| 3,185,399 A | 5/1965 | Pellicciotti |

(Continued)

FOREIGN PATENT DOCUMENTS

WO 99/60295 A2 11/1999

OTHER PUBLICATIONS

U.S. Appl. No. 16/119,885, filed Aug. 31, 2018 Notice of Allowance dated Mar. 13, 2019.

(Continued)

*Primary Examiner* — Mahdi H Nejad
(74) *Attorney, Agent, or Firm* — Rutan & Tucker, LLP

(57) ABSTRACT

An apparatus for a drill powered wire puller is disclosed. The drill powered wire puller includes a capstan, a housing positioned including a gear mechanism disposed therein, and a trigger assembly coupled to a trigger of a handheld power drill, wherein actuation of the trigger assembly causes depression of the trigger thereby activating the handheld power drill. The drill powered wire puller further includes a cradle plate including a notch positioned at a proximal end of the cradle plate, the notch being sized and shaped to receive the handheld power drill. The drill powered wire puller further includes a foot pedal system including a foot pedal, a base, a spring, wherein when the foot pedal receives pressure, tension is created on the throttle causing actuation of the trigger assembly and activation of the handheld power drill.

15 Claims, 28 Drawing Sheets

(56) References Cited

U.S. PATENT DOCUMENTS

| | | | |
|---|---|---|---|
| 3,190,616 | A | 6/1965 | Oleson |
| 3,610,582 | A | 10/1971 | Passoni |
| 3,968,952 | A | 7/1976 | Newell |
| 3,985,188 | A | 10/1976 | Steele |
| 4,196,864 | A | 4/1980 | Cole |
| 4,270,734 | A | 6/1981 | Straight |
| 4,290,584 | A | 9/1981 | Eckels et al. |
| 4,456,225 | A | 6/1984 | Lucas |
| 4,497,470 | A | 2/1985 | Carter et al. |
| 4,951,890 | A | 8/1990 | Sossamon |
| 4,956,889 | A | 9/1990 | Kirk |
| D322,557 | S | 12/1991 | Cummings |
| D322,920 | S | 1/1992 | Wolfe |
| 5,094,570 | A * | 3/1992 | LaCombe, Jr. ........ B23Q 5/268 173/19 |
| 5,149,056 | A | 9/1992 | Jones |
| 5,277,350 | A | 1/1994 | Thornbury, Jr. |
| 5,322,397 | A | 6/1994 | Spear |
| D348,758 | S | 7/1994 | Lichtenvort |
| 5,376,035 | A | 12/1994 | Forrest |
| 5,464,193 | A | 11/1995 | Wrate |
| 5,509,489 | A | 4/1996 | Lower, Jr. |
| 5,820,317 | A | 10/1998 | Van Troba |
| 5,863,160 | A | 1/1999 | Havener |
| 5,885,036 | A | 3/1999 | Wheeler |
| 5,984,273 | A | 11/1999 | Ray |
| 6,286,815 | B1 * | 9/2001 | Ray ........................ B65H 51/06 254/134.3 R |
| 6,361,021 | B1 | 3/2002 | Brennan |
| 6,386,512 | B1 | 5/2002 | Pecot et al. |
| 6,431,524 | B1 | 8/2002 | Weber |
| 6,467,755 | B2 | 10/2002 | Reilly et al. |
| D468,100 | S | 1/2003 | Bowling |
| 6,533,248 | B1 | 3/2003 | Schafer |
| 6,682,050 | B1 | 1/2004 | Ray |
| 6,705,597 | B1 | 3/2004 | Reilly et al. |
| D489,157 | S | 4/2004 | Lawson |
| D513,650 | S | 1/2006 | Elliott |
| 7,278,808 | B1 | 10/2007 | Sisk, Sr. et al. |
| 7,309,060 | B2 | 12/2007 | Baughman et al. |
| 7,357,612 | B1 | 4/2008 | Paul |
| 7,410,336 | B2 | 8/2008 | Parks |
| 7,588,109 | B2 | 9/2009 | Wachendorf et al. |
| 7,712,726 | B1 | 5/2010 | Jernigan |
| 7,789,375 | B2 | 9/2010 | Ying |
| 8,056,884 | B2 | 11/2011 | LaFreniere |
| D682,073 | S | 5/2013 | Payne |
| D748,446 | S | 2/2016 | Fretz |
| D751,880 | S | 3/2016 | Howell |
| D775,448 | S | 12/2016 | Fretz |
| D776,507 | S | 1/2017 | Faverio et al. |
| 10,088,016 | B2 | 10/2018 | Bujold et al. |
| 10,294,067 | B1 | 5/2019 | DeBellis |
| 11,139,643 | B1 | 10/2021 | DeBellis |
| 2002/0043657 | A1 | 4/2002 | Ray |
| 2003/0075711 | A1 | 4/2003 | Cook et al. |
| 2003/0098450 | A1 | 5/2003 | Cook et al. |
| 2004/0007701 | A1 * | 1/2004 | Goulet ..................... B66D 1/08 254/213 |
| 2007/0284559 | A1 | 12/2007 | Plummer |
| 2009/0078921 | A1 | 3/2009 | Plummer |
| 2011/0057157 | A1 | 3/2011 | Holley |
| 2011/0079967 | A1 | 4/2011 | Presley |
| 2014/0001427 | A1 | 1/2014 | Fretz et al. |
| 2015/0272596 | A1 * | 10/2015 | Vij ......................... A61B 5/055 600/417 |
| 2018/0296861 | A1 * | 10/2018 | Rogge .................... B66D 1/36 |
| 2018/0328452 | A1 * | 11/2018 | Bujold .................. B60P 7/0853 |

OTHER PUBLICATIONS

U.S. Appl. No. 16/102,591, filed Aug. 13, 2018, Non-Final Office Action dated Mar. 12, 2021.
U.S. Appl. No. 16/102,591, filed Aug. 13, 2018, Notice of Allowance dated Jun. 10, 2021.
U.S. Appl. No. 16/417,405, filed May 20, 2019 Final Office Action dated Nov. 1, 2021.
U.S. Appl. No. 16/417,405, filed May 20, 2019 Non-Final Office Action dated Jul. 19, 2021.

* cited by examiner

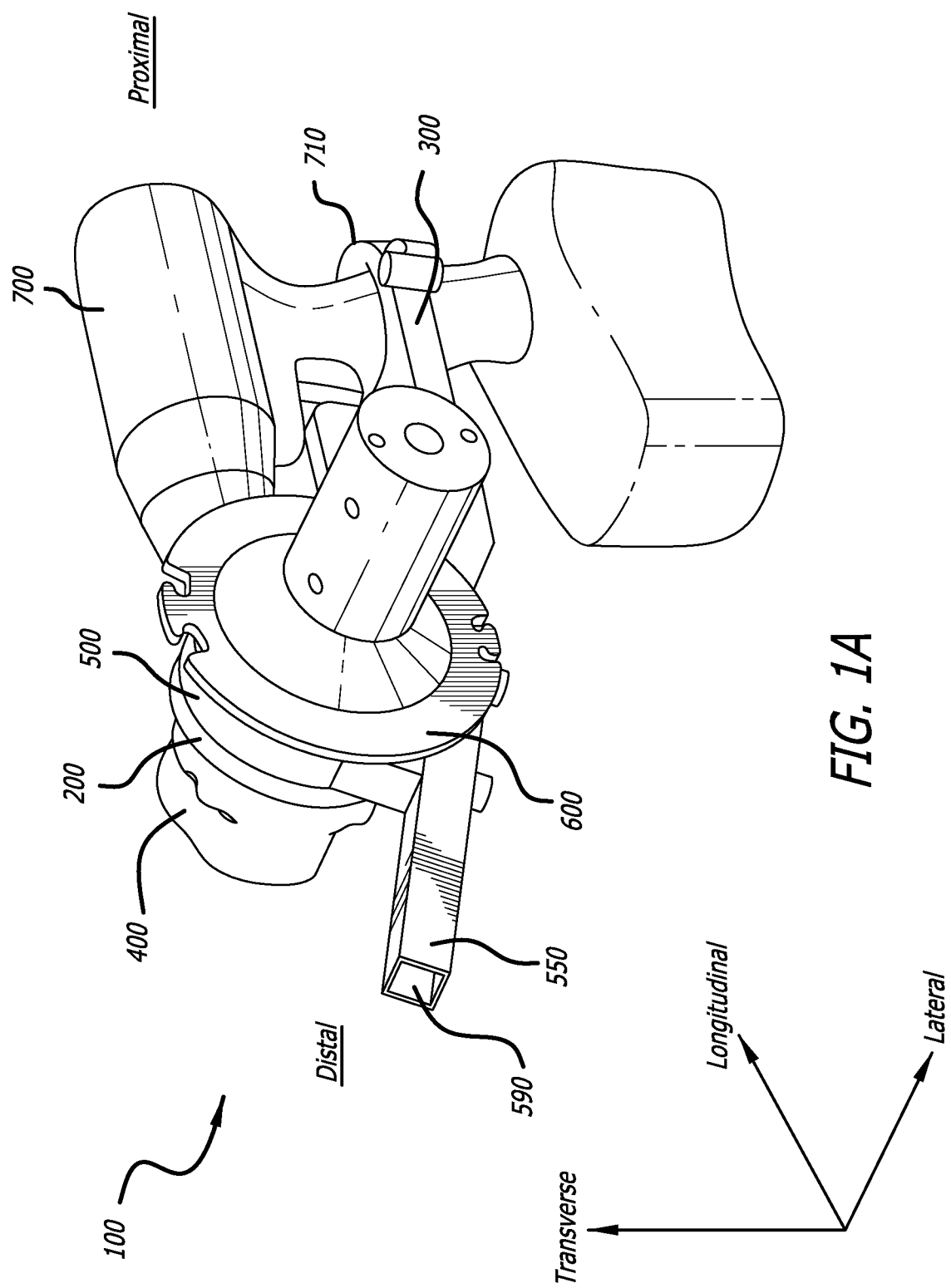

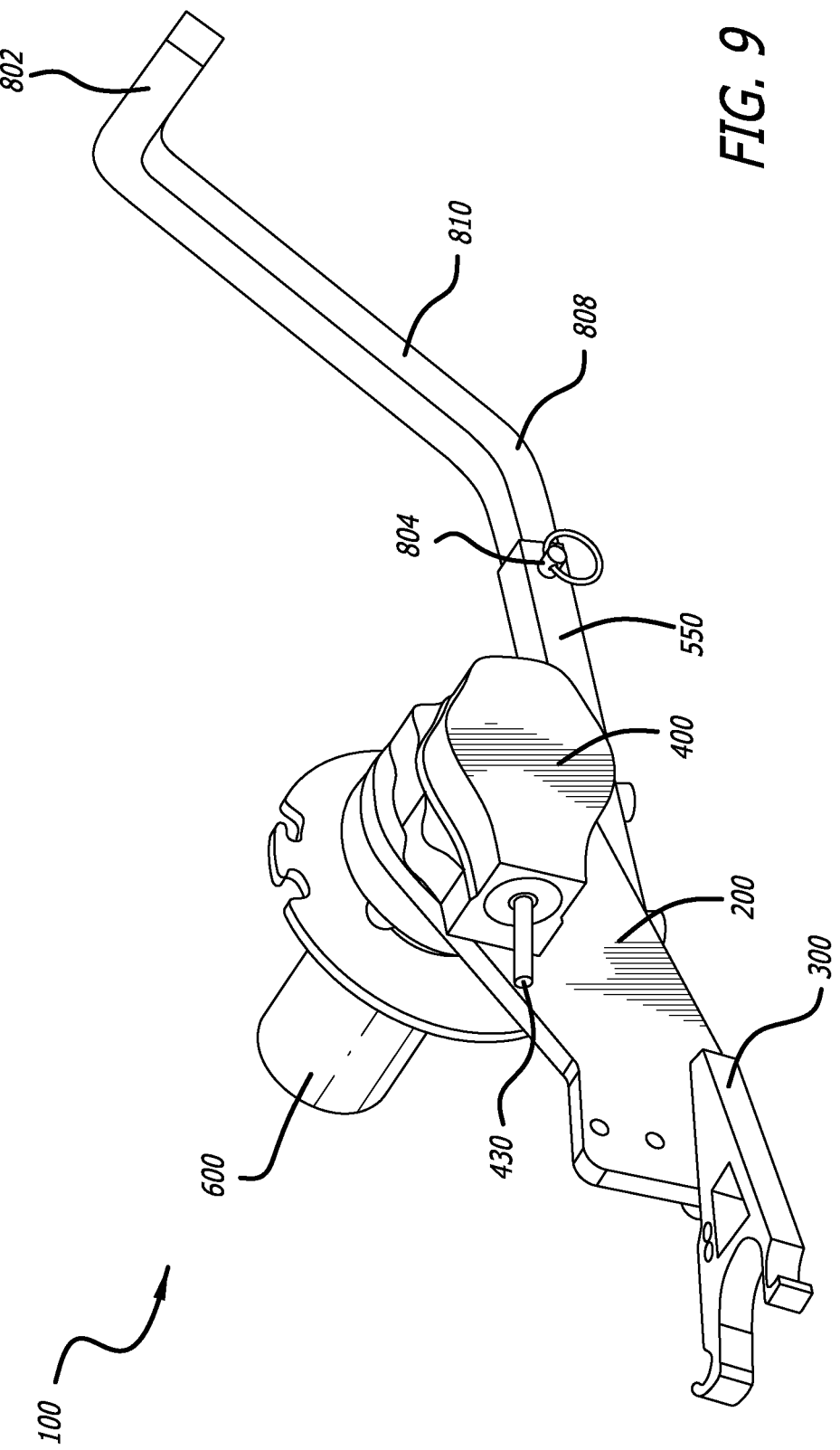

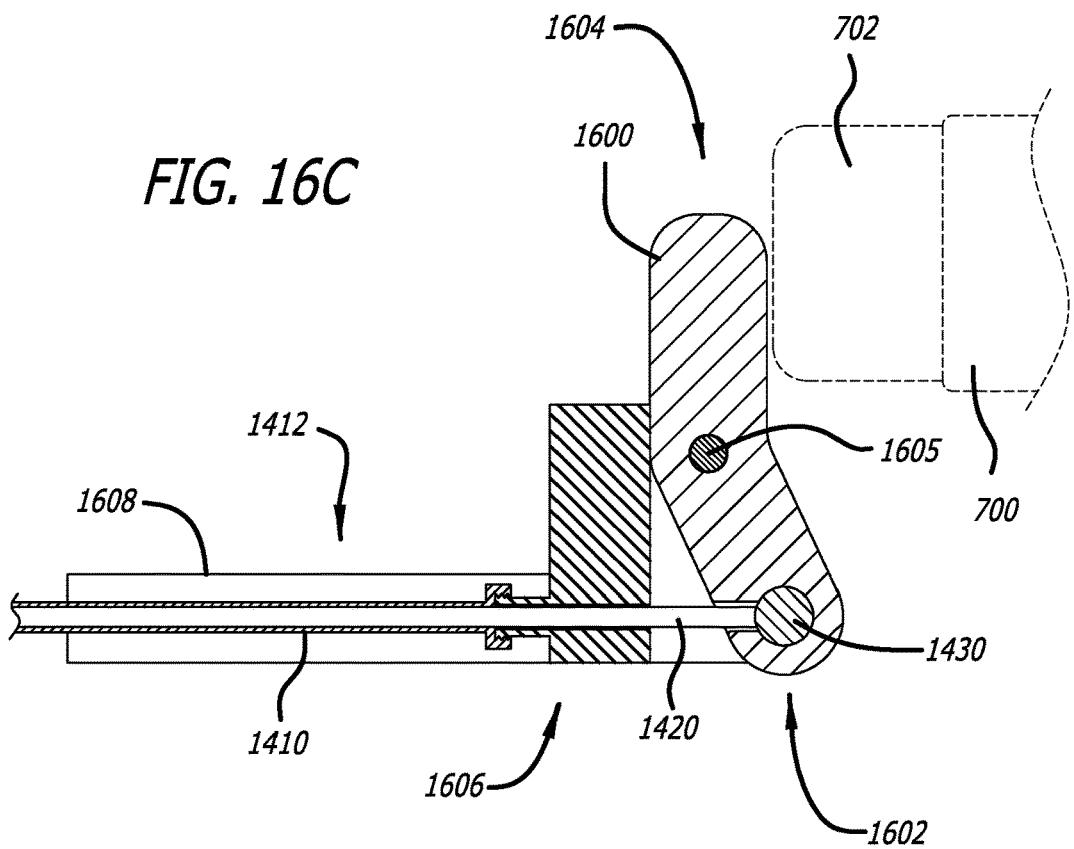
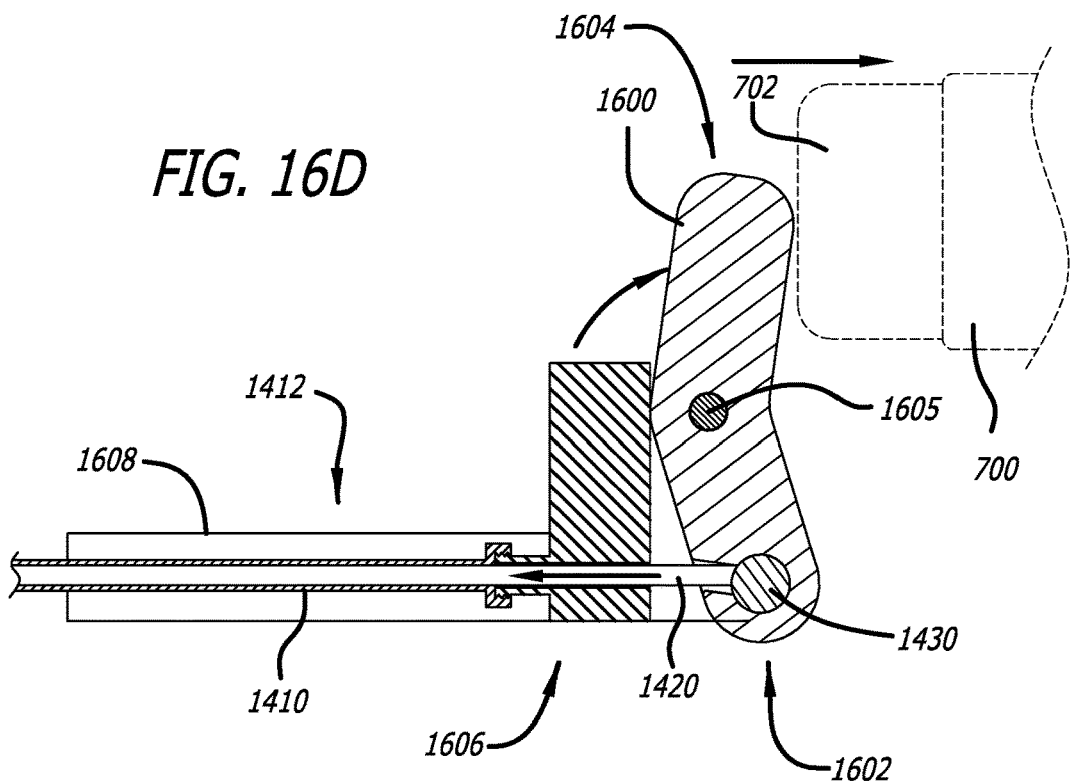

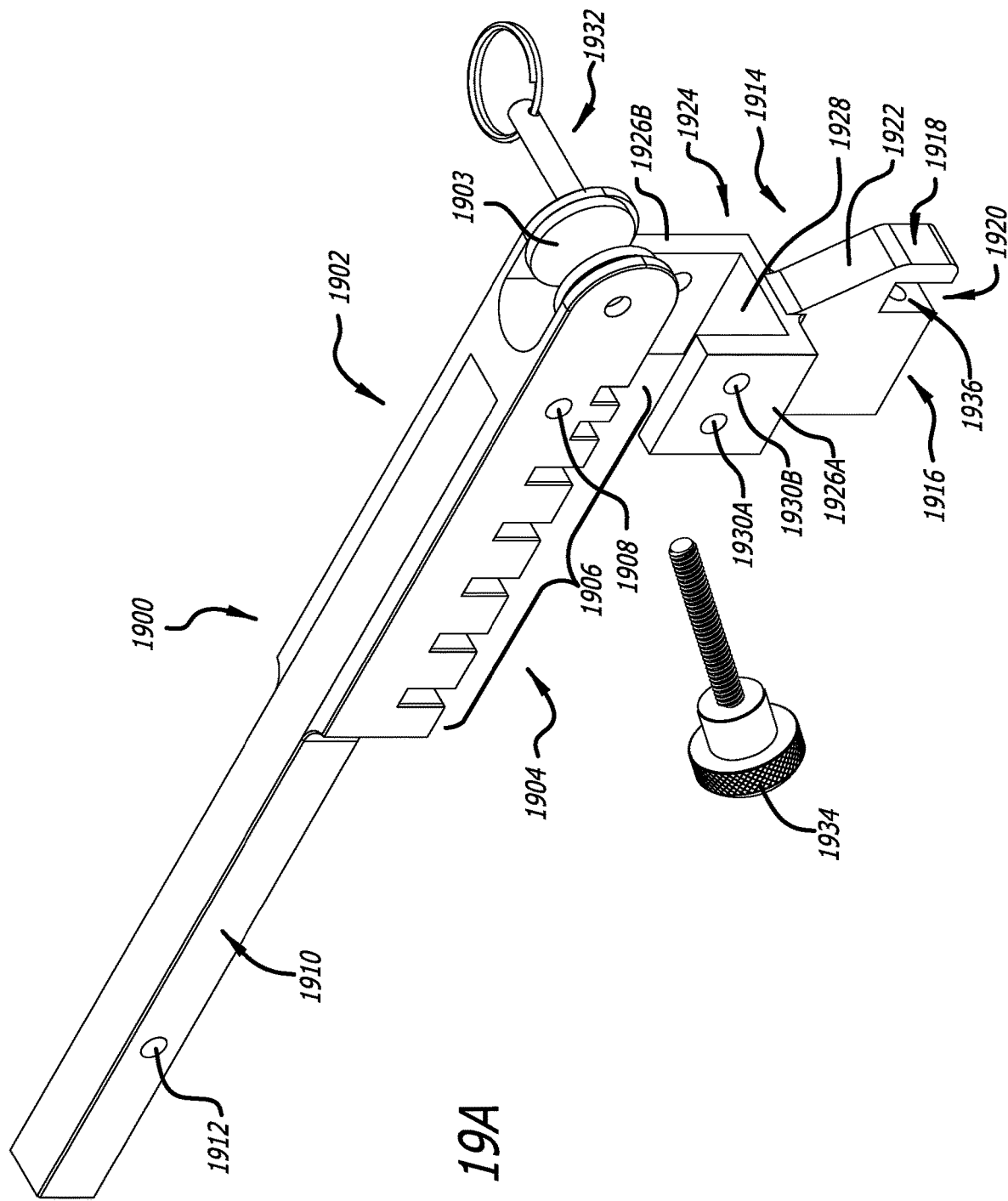

US 11,472,660 B1

SYSTEM AND APPARATUS FOR DRILL POWERED HANDHELD LINE PULLING

CROSS-REFERENCE TO RELATED APPLICATIONS

This application is continuation-in-part of U.S. patent application Ser. No. 16/471,405, filed May 20, 2019, which is a continuation of U.S. patent application Ser. No. 16/119,885, filed Aug. 31, 2018, now U.S. patent Ser. No. 10/294,067, which is a continuation-in-part of U.S. patent application Ser. No. 16/102,591 filed Aug. 13, 2018, which is a continuation of U.S. Patent Application No. 29/603,787 filed May 12, 2017, the entire contents of which are incorporated by reference herein.

FIELD

Embodiments of the disclosure relate to the field of tools. More specifically, an aspect of the invention relates to an apparatus for improved wire pulling devices, which can be coupled with powered rotary tools, such as handheld powered drills.

GENERAL BACKGROUND

According to the US Department of Labor, over 31,000 workmen are injured each year from stress and strain injuries caused by lifting, reaching, pulling and bending. For electricians, the job of feeding wires through conduits on building sites is a laborious, time consuming job that causes excessive strain on the shoulders, arms, back and wrists. These problems are exacerbated when reaching in hard to access areas such as junction boxes in ceilings, conduits in gutters and panels, light standards, underground conduits, and the like. While the Occupational Health and Safety Agency (OSHA) has provided guidelines with the aim of reducing work related injuries, such guidelines are often overlooked in favor of job efficiency.

Current products available for pulling wire, often called "tuggers," are big, bulky and not optimally designed for branch circuits, the most common of wire pulling jobs for electricians. Moreover these are time consuming to set up and manage, and are often too big to access confined areas. Accordingly, electricians often resort to pulling wire by hand using a rope, fish tape, mule tape, or string, leading to physical stresses and strains.

What is needed, therefore, is a small, portable and compact electric winching system that is both powerful and stable enough to provide the necessary torque, small enough to be used in the confined areas, and only requires a single operator. It also needs to be quick to setup and engage a line to encourage usage over manual pulling.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 1A is a top front perspective view for a drill powered wire puller shown in an exemplary environment of use.

FIG. 9 is a perspective view of a drill powered wire puller with a support arm.

FIG. 16C is a first sectional view of the trigger assembly of FIG. 16A coupled with a drill powered wire puller shown in an exemplary environment of use.

FIG. 16D is a second sectional view of the trigger assembly of FIG. 16A coupled with a drill powered wire puller shown in an exemplary environment of use.

FIG. 19A is a perspective view of a support arm configured for coupling with a drill powered wire puller and a tube clamp.

DETAILED DESCRIPTION

Terminology

In the following description, certain terminology is used to describe aspects of the invention. In other instances, specific numeric references such as "a first component," may be made. However, the specific numeric reference should not be interpreted as a literal sequential order but rather interpreted that the "first component" is different than a "second component." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 1B:
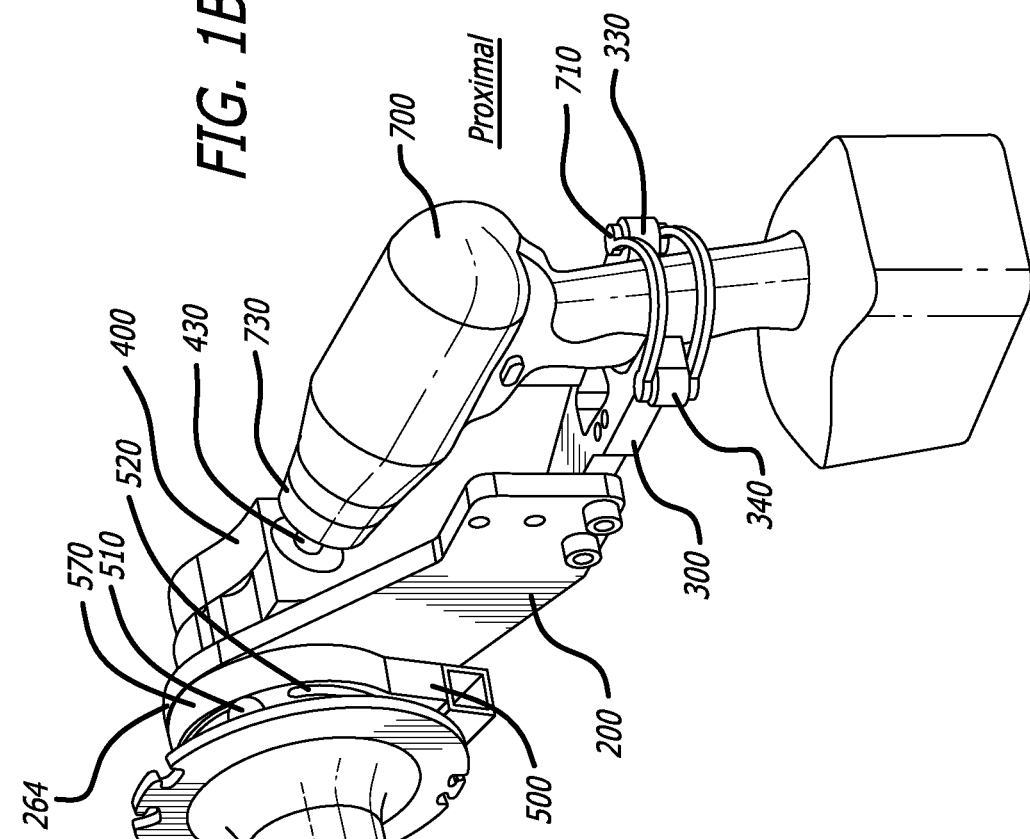
FIG. 1B is a rear left side perspective view of a drill powered wire puller shown in an exemplary environment of use.

To assist in the description of the components of a wire pulling device (sometimes referred to as a "drill powered wire puller"), longitudinal, lateral, and transverse axes are shown in FIGS. 1A, 1B, and are used consistently throughout. A "longitudinal axis" extends from a rear end to a front end of the device, and is generally horizontal to the device when viewed from a right-side, left-side, or top view of the device, e.g. FIGS. 2, 3, and 4. A "lateral axis" is normal to the longitudinal axis when viewed from a top view of the device, e.g. FIG. 4. A "transverse axis" extends normal to both the longitudinal and lateral axes. Also, the terms "proximal" and "distal," used to describe the wire puller and its components, are shown in FIGS. 1A, 1B and are used in reference to the powered drill, shown in FIGS. 1A, 1B. Accordingly, a "distal" end is commensurate with a "front" end, and a "proximal" end is commensurate with a "rear" end.

The drill powered wire puller can be configured to pull various types of braided or unbraided wire, cord, string, rope, line, fish tape, mule tape, multiple branch and data circuits, small feeder wire circuits, telephone wires, low voltage wires, or the like. Each of which may include various gauges, thicknesses, or degrees of flexibility, for example gauges or thicknesses can range from 22 to 1/0. Accordingly, as used herein the term "line" is considered to include any wire, cord, or the like, of any gauge or thickness, that can be wound around the capstan 600. In use, the line typically emerges from an exit of a conduit, gutter or similar structure through which the line is being pulled. The exit of the conduit may include a junction box or similar additional structures. As used herein a "source" of the line is an exit point from such a structure, from which the line is pulled. The "angle of the line" or "angle of resistive forces from the line" is considered to be the direction of the line source in three-dimensional space relative to the drill powered wire puller 100.

Lastly, in certain situations the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Illustrative Embodiment of a Drill Powered Wire Puller

Referring to FIGS. 1-13, an exemplary apparatus operating as a drill powered wire puller 100 is shown. The drill powered wire puller 100 may feature a center plate 200, a cradle plate 300, a housing 400, a support 500, a receiver 550, and a capstan 600.

Figure 3:
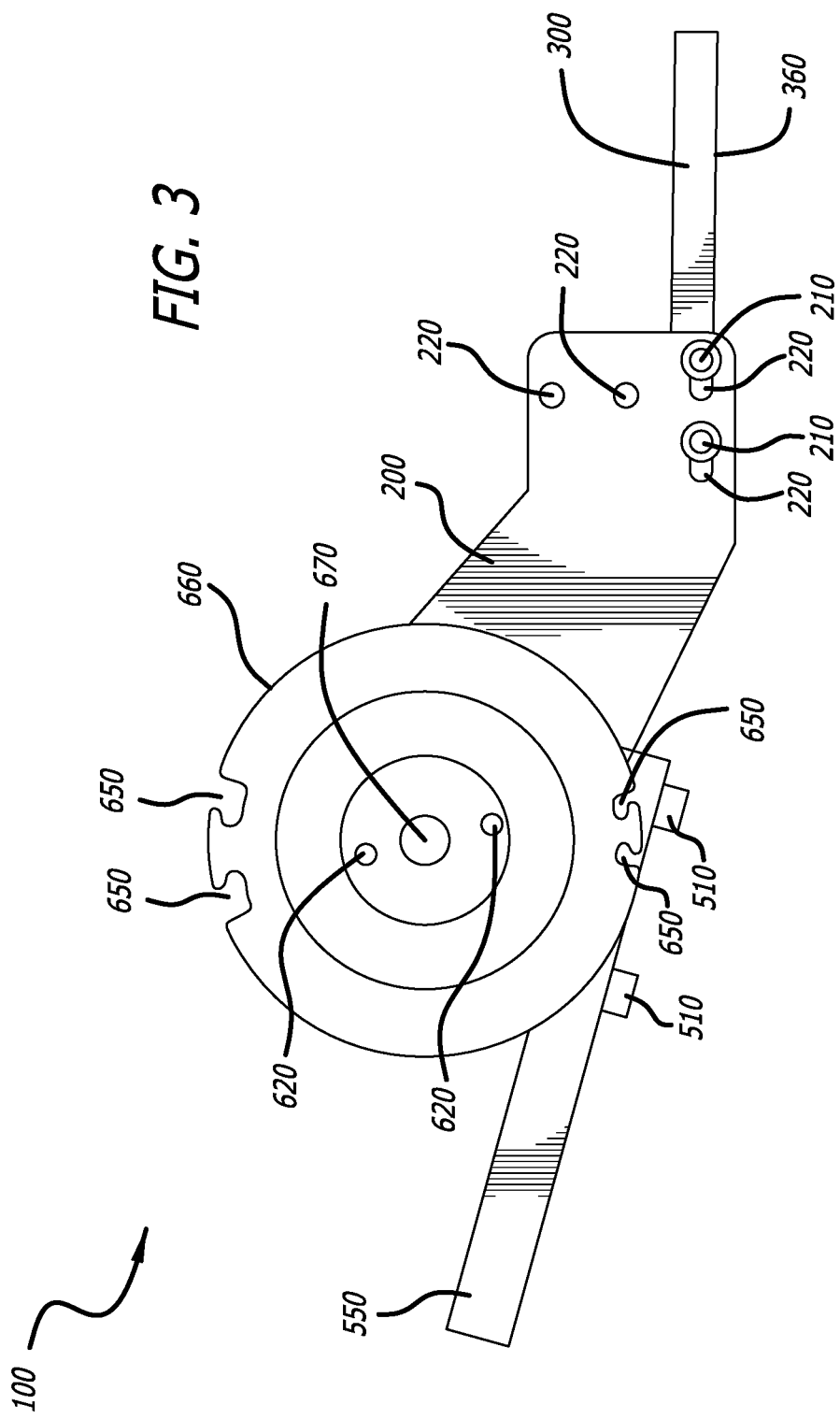
FIG. 3 is a left-side view of a drill powered wire puller.
Figure 6:
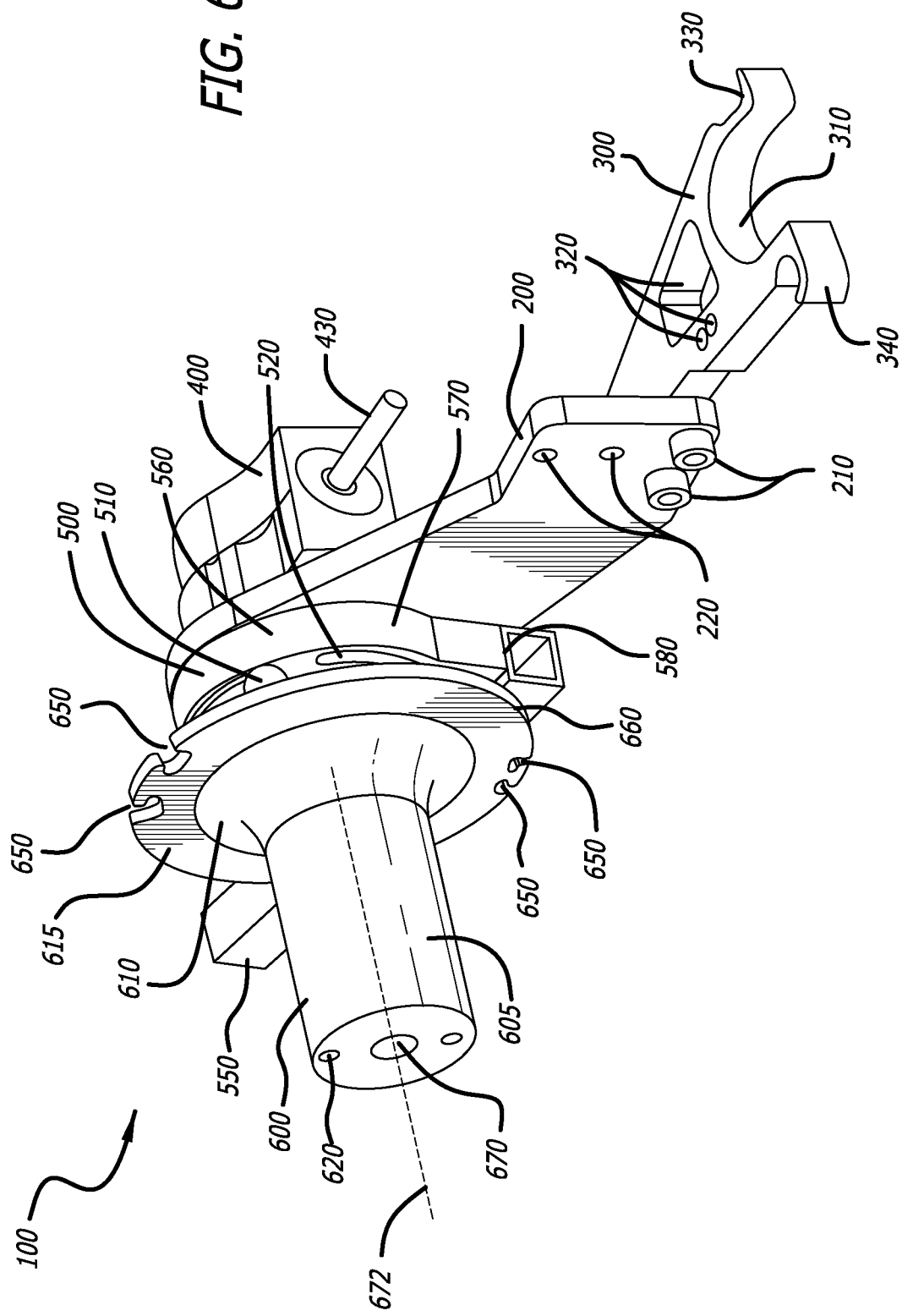
FIG. 6 is a top rear perspective view of a drill powered wire puller.

According to this embodiment of the disclosure, the center plate 200 extends along a plane defined by the longitudinal and transverse axes. The center plate 200 is coupled at a proximal end with a cradle plate 300. The cradle plate 300 extending along a plane substantially perpendicular to the center plate 200, defined by the longitudinal and lateral axes. The cradle plate 300 may be coupled to the center plate 200 using one or more socket cap bolts 210, as shown in FIG. 3. Center plate 200 includes apertures 220 in a proximal end traversing the center plate 200 along a lateral axis. Two of the apertures 220 may define an oblong cross-sectional shape, two of the apertures may define a circular cross-section. The cradle plate 300 includes a U-shaped notch 310 in a proximal end, as shown in FIG. 6. The cradle plate 300 includes apertures 320 traversing the cradle plate 300 along a transverse axis. The cradle plate 300 includes a first hook or catch 330 and a second hook or catch 340 disposed at a proximal end, either side of the U-shaped notch 310.

Figure 2:
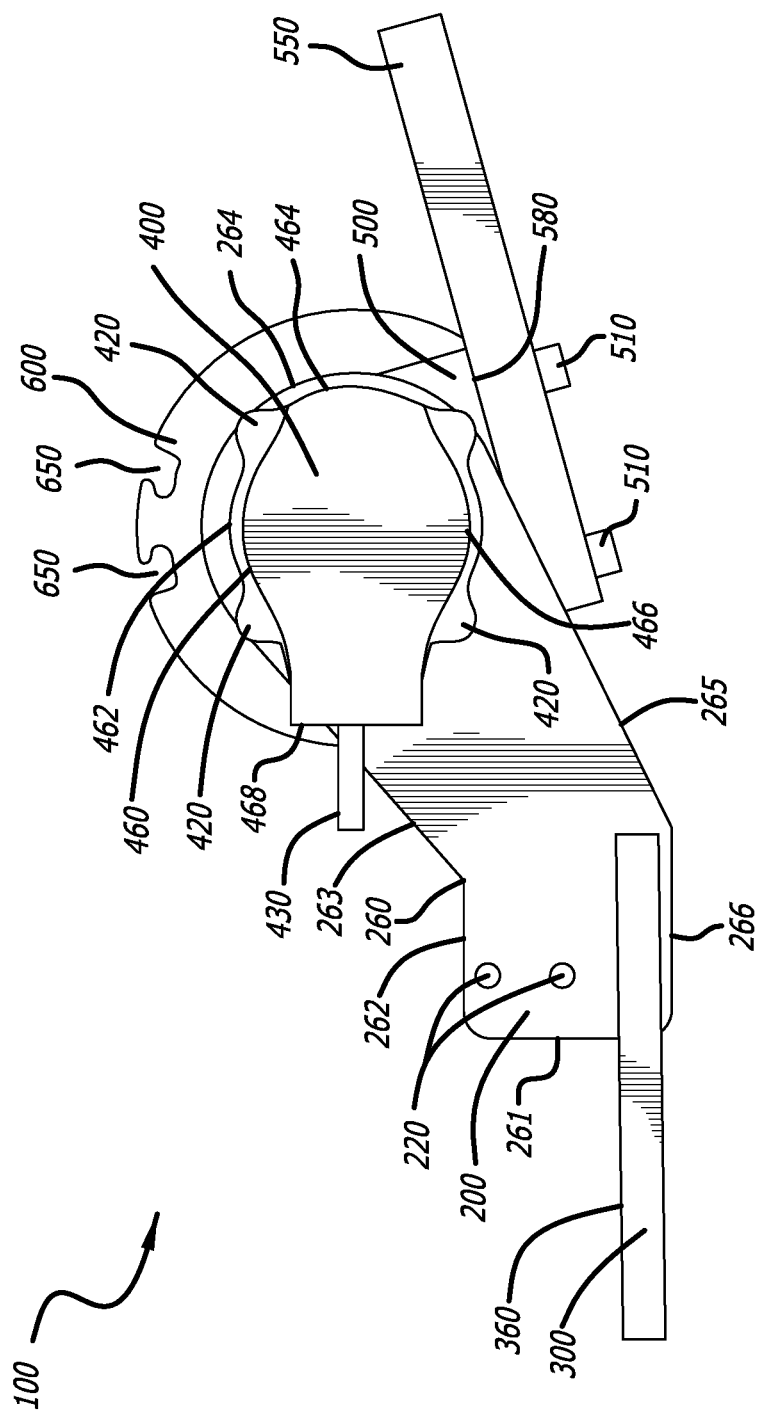
FIG. 2 is a right-side view of a drill powered wire puller.

The center plate 200 is defined by a perimeter 260 as shown in FIG. 2. When viewed from a side view, the perimeter 260 is formed by a first section 261 of the center plate 200 extends from a proximal lower corner of the center plate 200 transversely upwards, a second section 262 extends longitudinally distally before a third section 263 extending upwards and distally at an acute angle relative to the longitudinal axis. The perimeter 260 is further formed by a fourth section 264 with an arc-shaped of substantially 180° with a fifth section 265 extending proximally at an acute angle to the longitudinal axis and a sixth section 266 extending proximally parallel to the longitudinal axis to a proximal lower corner of the center plate 200. Advantageously, the center plate 200 extends along a vertical longitudinal plane to provide greatest stability and strength to the device commensurate with this plane. The drill powered wire puller 100, when in use, is subject to large resistive forces from the line being pulled. Often the direction of these resistive forces is substantially longitudinal and along a vertical axis. Accordingly, the design of the center plate 200 provides great stability and strength to the wire puller along the longitudinally vertical plane. It will be appreciated that the resistive forces may also be orientated at angles other than the longitudinal vertical plane, and the structure of the drill powered wire puller 100 as a whole also provides improved strength and stability with respect to these angles of resistive force, as will be discussed herein.

The cradle plate 300 is defined by a perimeter 360. When viewed from a top view, e.g. FIG. 4, a first section 361 of the perimeter 360 extends from a distal corner adjacent to center plate 200 and extends, perpendicular to the center plate 200, along a lateral axis. A second section 362 of the perimeter 360 then extends proximally, and laterally away from the center plate 200, at an acute angle to the longitudinal axis, the perimeter 360 then defines a first hook 330 at a proximal corner furthest from the center plate 200. A third section 363 of the perimeter 360 then extends laterally towards a central longitudinal axis defined by the center plate 200. A fourth section 364 of the cradle plate perimeter 360 then extends longitudinally distal and then curves through an arc of substantially 180° and extends longitudinally proximally to define a U-shaped notch 310. A fifth section 365 of the perimeter 360 then extends laterally towards a central axis and then defines a second hook 340. A sixth section 366 of the perimeter 360 extends longitudinally distally towards the distal corner adjacent to the center plate 200.

The housing 400 is coupled to a right (lateral) side of the center plate 200, adjacent a distal end, and extends along a lateral axis away from the center plate 200. As illustrated in FIG. 2, from a right-side view, the top 462 and bottom 466 edges of the housing outer perimeter 460 define a substantially circular shape. The proximal 468 and distal 464 edges of the housing perimeter 460 protrude beyond the substantially circular diameter defined by the top 462 and bottom 466 edges, the proximal edge 468 protruding more than the distal 464 edge. The housing 400 includes a housing axle 430 extending proximally from a proximal side 468 of the housing 400. The housing 400 further includes four protrusions 420 extending beyond the substantially circular shape defined by the top 462 and bottom 466 edges, and are adjacent the center plate 200.

Figure 5:
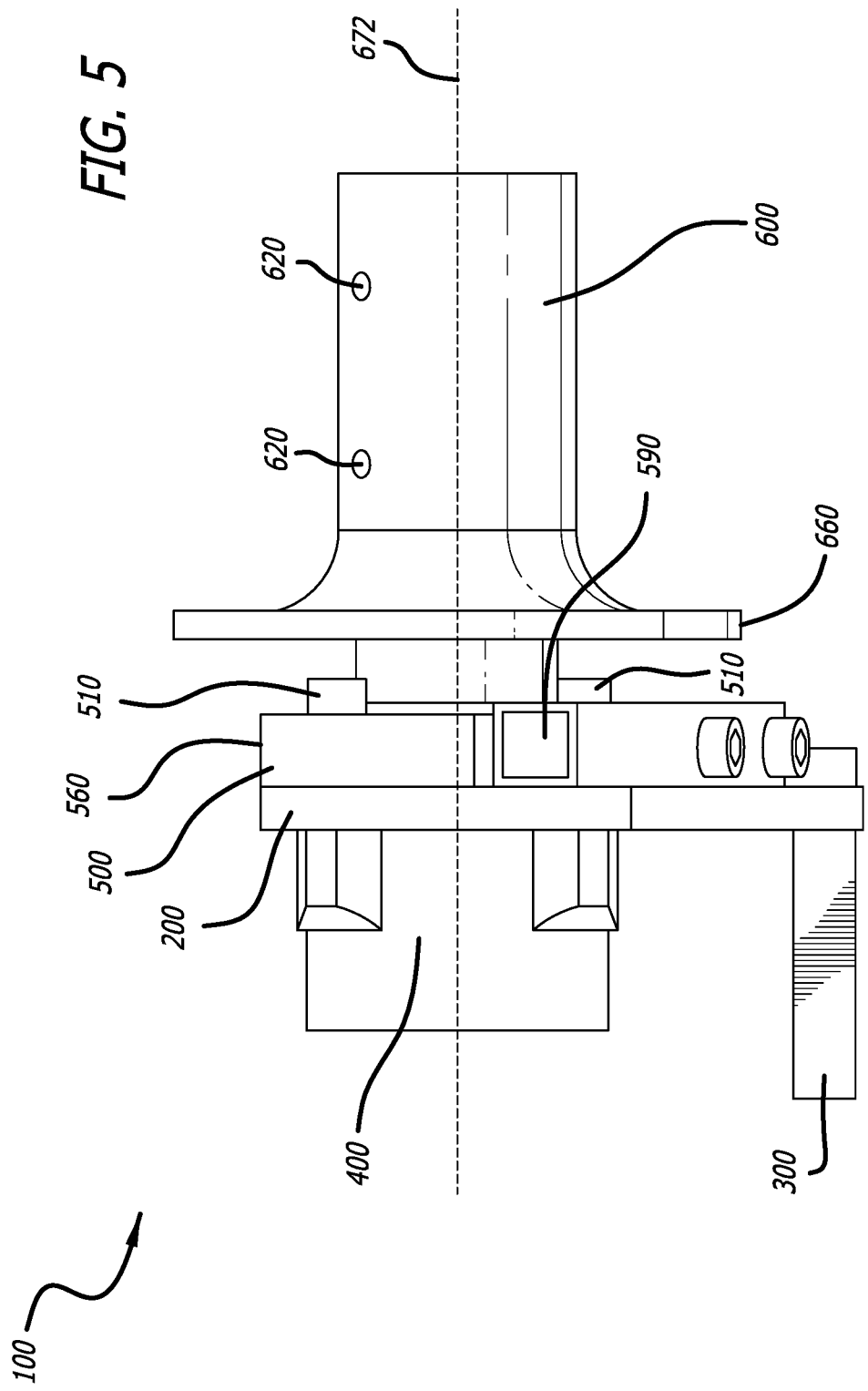
FIG. 5 is a front view of a drill powered wire puller.

A support 500 is coupled with a left side of the center plate 200 and extends laterally away from the center plate 200. As shown in FIG. 5, the support 500 is coupled with the center plate 200 using socket cap bolts 510. The support outer perimeter 560 defines a substantially a circular outer edge defining an arc 570. A lower side of the perimeter 560 extends downwards beyond the diameter of the circle defined by arc 570 and defines a substantially straight lower edge 580. A receiver 550 can be coupled with the support 500 along the lower edge 580 using socket cap bolts 510. The receiver 550 is a tubular bar that defines an opening 590 with a square cross-sectional area. The receiver 550 can extend distally at an acute angle to the longitudinal axis.

Figure 4:
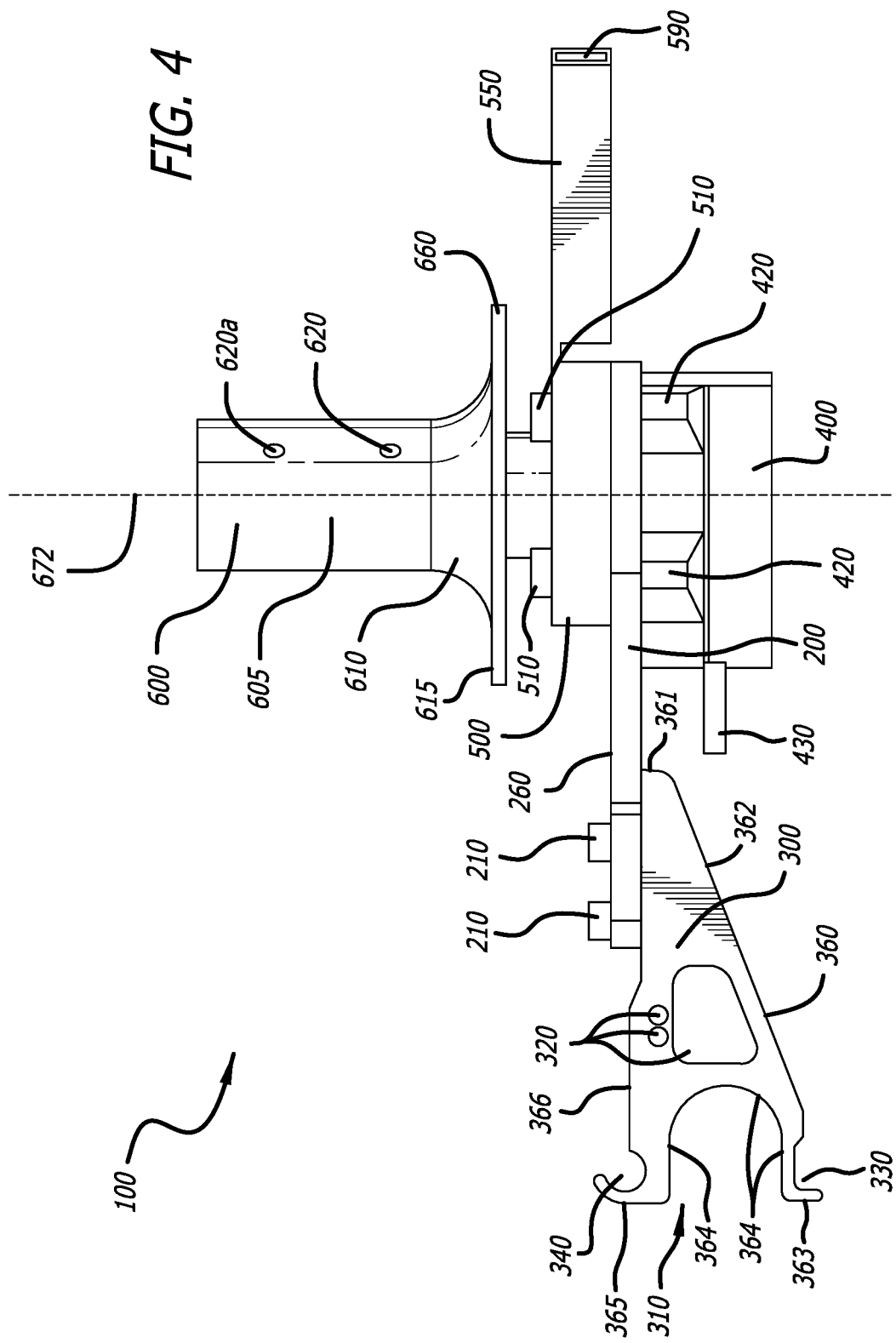
FIG. 4 is a top view of a drill powered wire puller.

A capstan 600 can extend laterally from a left side of the support 500. As best seen in FIGS. 3, 6, from a left-side view, the capstan 600 defines a substantially circular outer perimeter 660 about a capstan center point 670. A central axis 672 of the capstan 600 extends along a lateral axis through the capstan center point 670. The outer perimeter of the capstan 660 includes notches 650 extending radially inward to define one or more "cleat" shapes in the outer perimeter. The capstan 600 extends laterally from the support 500 in a radially symmetrical profile, about the capstan central axis. As best seen in FIG. 4, when viewed from a top side view, the radially symmetrical side profile of the capstan 600 extends laterally away from the support 500 before extending radially outward, perpendicular to the capstan central axis. The capstan then extends laterally away from the support 500 before extending radially inward to define a capstan flange 615. The side profile of the capstan 600 then extends radially inward and laterally outward to define a concave curve that arcs through substantially 90°, to define a radially curved portion 610, before extending laterally outward, parallel to the lateral axis and terminating in a left-most surface of the capstan, perpendicular to the capstan central axis, to define a capstan drum 605. A surface of the capstan 600 may include screw apertures 620.

As shown in FIG. 1, in a preferred environment, the wire puller 100 is configured for coupling to a powered rotary tool, such as a handheld power drill 700. The U-shaped notch 310 of the cradle plate 300 can couple with a handle of the handheld power drill 700. The second hook 340 can receive a strap 710 that encircles a proximal edge of the handle of the handheld power drill 700.

Figure 7:
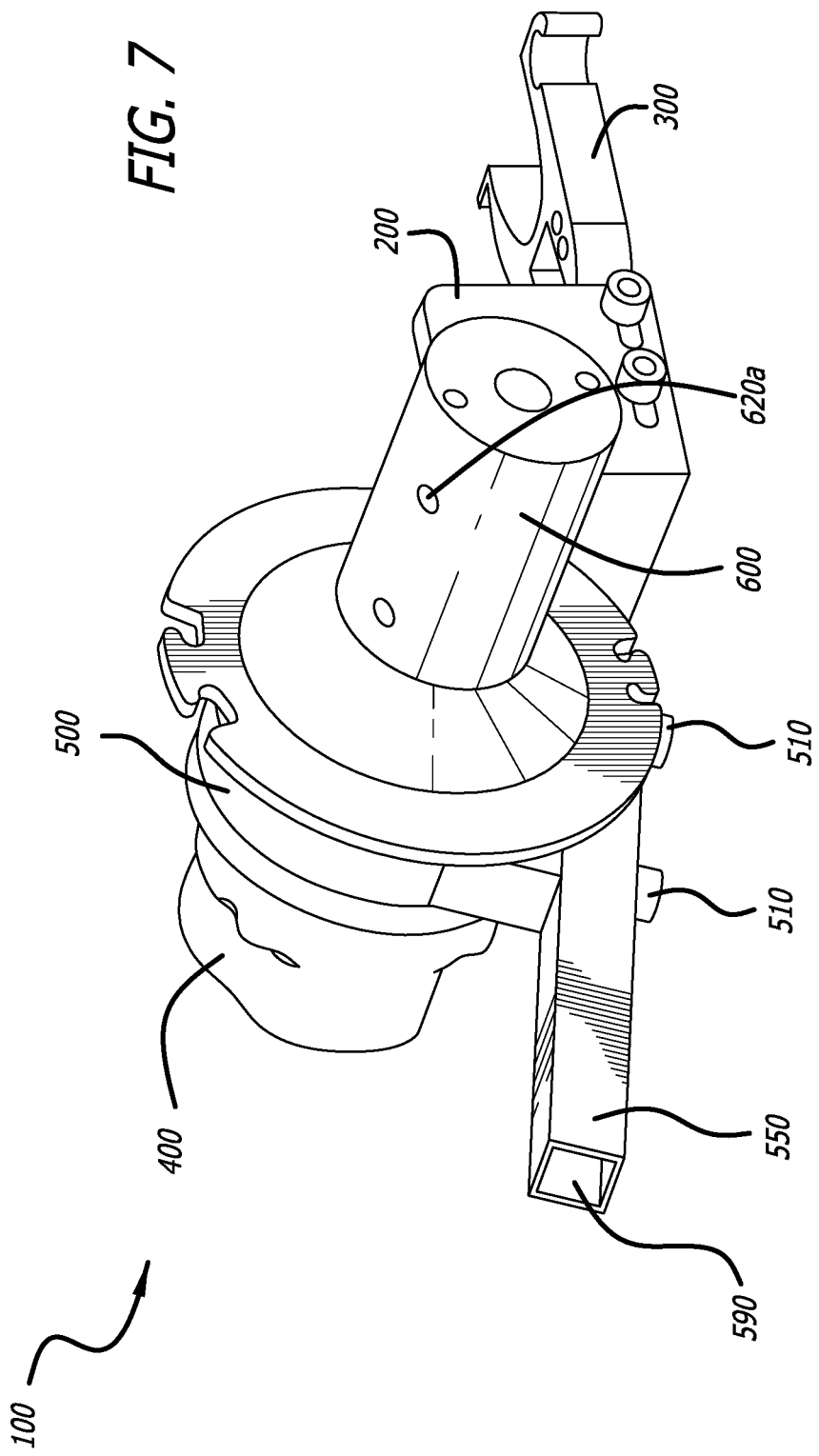
FIG. 7 is a right front perspective view of a drill powered wire puller.
Figure 8:
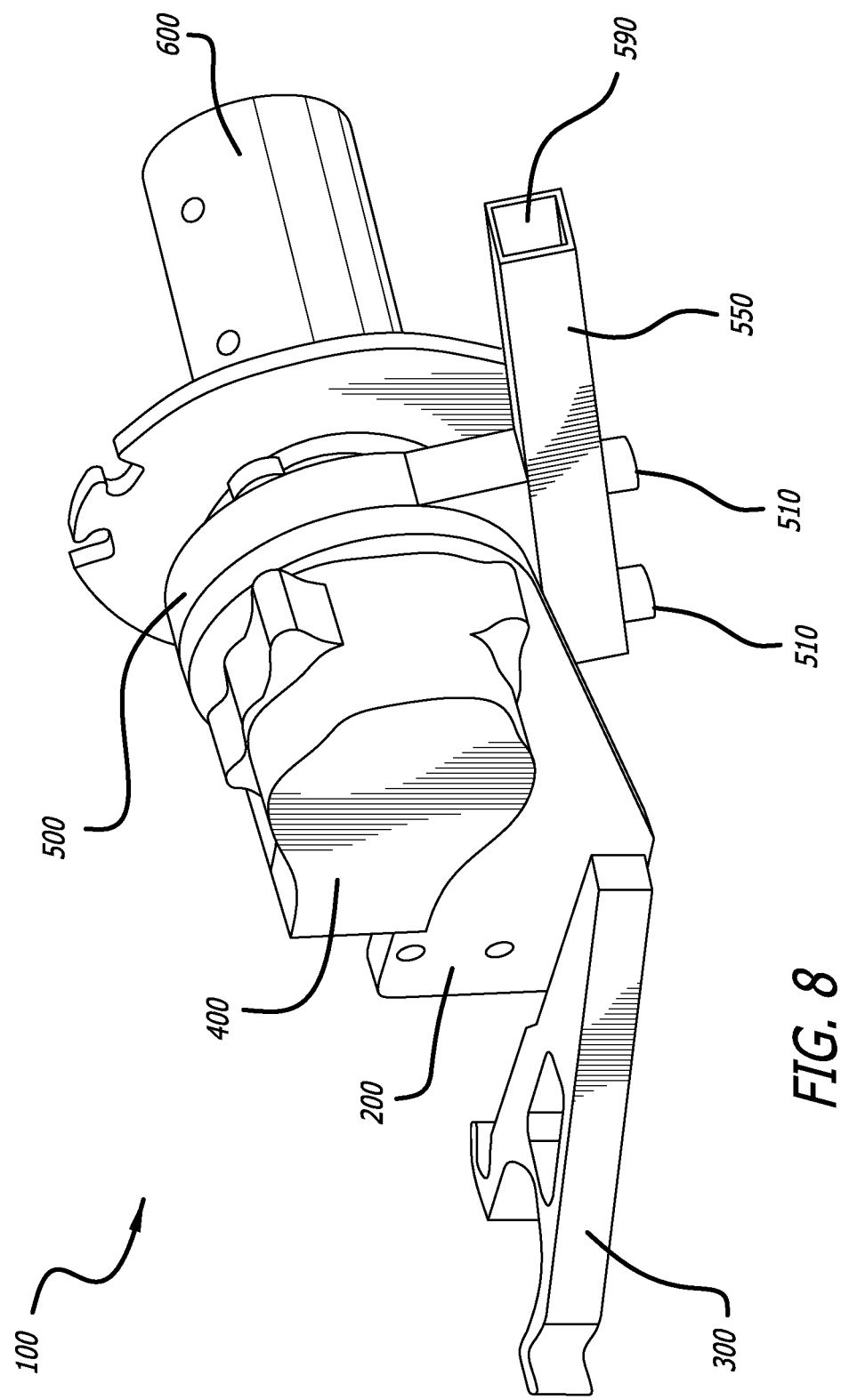
FIG. 8 is a front right perspective view of a drill powered wire puller.
Figure 10A:
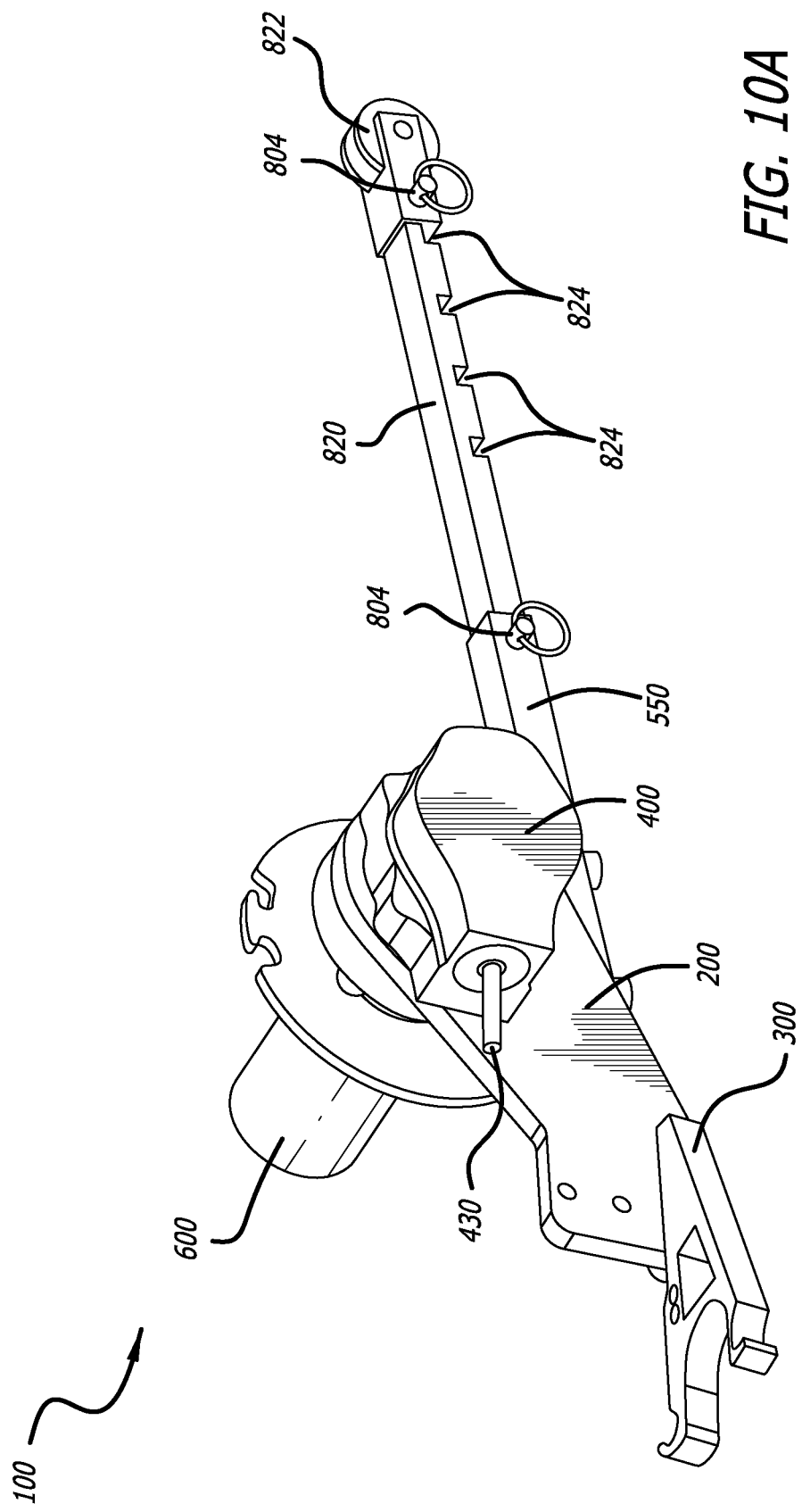
FIG. 10A is a perspective view of a drill powered wire puller with a support arm.

As shown in FIGS. 9-10A, the receiver 550 may be coupled with different types of support arms 800, for example support arm 810 and support arm 820. In an embodiment support arms 800 can also be coupled directly to support 500 using bolts 510 disposed through apertures 812, without the need for receiver 550. As shown in FIGS. 7, 10A, the receiver 550 includes a first end with an opening 590 into which a support arm 800 is inserted. In an embodiment, the support arm 800 can include a support footing 802, a spool member 822, or combinations thereof at the distal end. In an embodiment, support arm 820 can include four notches 824 disposed on a lower side of arm and extending transversely upwards, as will be discussed in more detail herein.

In an embodiment, the drill powered wire puller 100 may be coupled with a battery powered hand drill 700. It will be appreciated that other forms of rotary tools may be used and fall within the scope of the present invention, including but not limited to, battery or mains electricity powered drills, drivers, screwdrivers, torque wrenches, hand-powered or manual powered cranks, gasoline powered engines, and the like.

In an embodiment, various components of the drill powered wire puller 100, including the center plate 200, cradle plate 300, housing 400, support 500, receiver 550, capstan 600, and components thereof, can be formed from milled aluminum. It will be appreciated that other materials that display suitable physical and mechanical properties may also be used, including steel, plastic, and the like. In an embodiment, various components of the drill powered wire puller 100, including the center plate 200, cradle plate 300, housing 400, support 500, receiver 550, capstan 600, and components thereof, can include various recesses or apertures, for example aperture 320, in order to reduce the overall weight of the drill powered wire puller 100 without compromising strength or stability. In an embodiment, the drill powered wire puller 100 may include a sling or shoulder strap (not shown). The shoulder strap may be attached to the center plate 200 using apertures 220 or any suitable attachment mechanism known in the art.

Figure 1C:
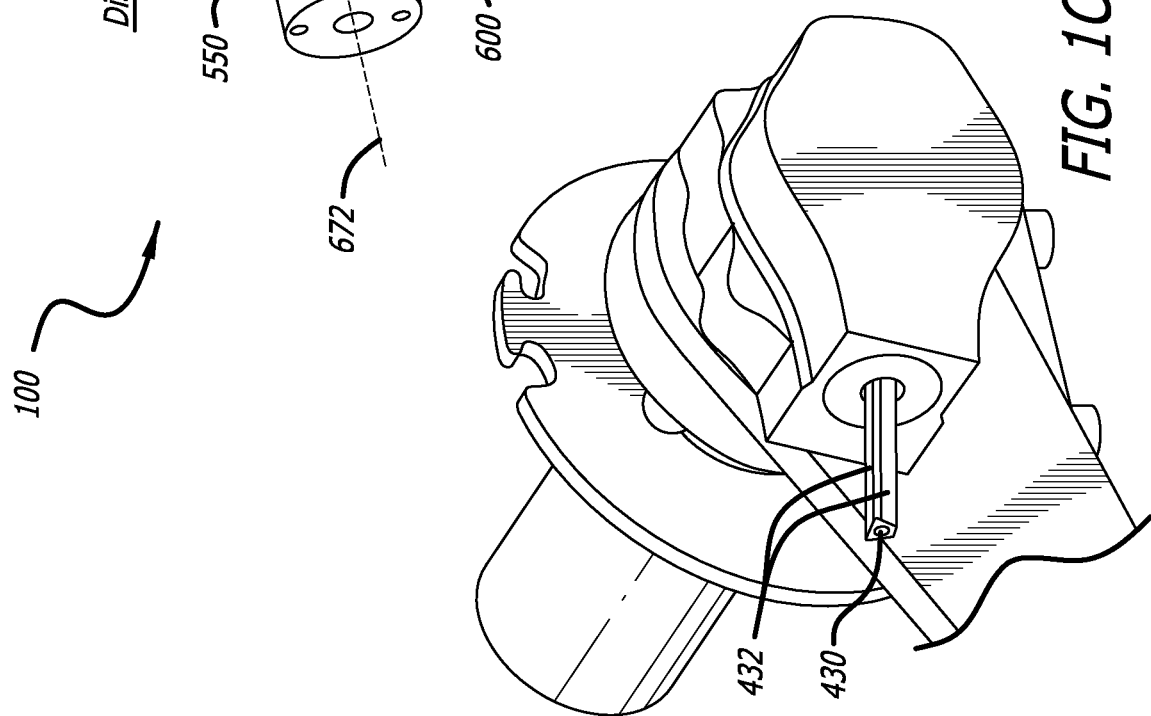
FIG. 1C is a close up rear right-side perspective view of a drill powered wire puller.

In an embodiment, the housing 400 includes gear mechanisms disposed therein which receive the rotational momentum from the handheld powered drill 700 and transfers momentum to the capstan 600. As shown in FIGS. 1B, 1C the chuck 720 of the handheld powered drill 700 can be coupled with an axle 430. The axle 430 extends from a proximal side of the housing along a longitudinal axis. The axle 430 can include one or more flattened surfaces 432 along a longitudinal side of the axle 430. The one or more flattened surfaces 432 are orientated with respect to each other about the longitudinal axis and are configured to securely couple the chuck 730 with the axle 430 to ensure efficient transfer of rotational movement to the axle 430.

The gear mechanisms disposed in housing 400 can include a miter gear or a bevel gear arrangement that provides a gear ratio of between 1:0.1 and 1:2. As used herein, the gear ratio is presented as turns of the housing axle 430 relative to turns of the capstan 600. For example a gear ratio of 1:0.5 is equivalent to a full turn, 360°, of the housing axle 430 which provides a half turn, 180°, of the capstan 600. In an embodiment other gear mechanisms, such as spiral bevel, worm gear, crown, helical, or the like, can be used in place of, or in conjunction with, the bevel gear or miter gear, or combinations thereof, and fall within the scope of the present invention. In an embodiment gear ratios can include between 1:0.1 to 1:2, with a preferred gear ratio of between 1:0.5 and 1:1. In an embodiment the drill powered wire puller 100 achieves a torque range of between 500 and 1,500 pound-foot (lbfft) with a preferred torque of 1,000 lbfft. In an embodiment, the gears are formed of hardened steel and can include a light oil lubricant disposed within the housing 400. It will be appreciated that other materials, which display suitable mechanical and physical properties, can be used to form the gears and fall within the scope of the present invention. Similarly other lubricants known in the art are considered to fall within the scope of the present invention.

In an embodiment, the housing protrusions 420 include tapped bolt housings configured to securely couple the housing with the center plate 200, support 500, capstan 600, or combinations thereof. For example, housing protrusions 420 can receive bolts 510 to couple the support 500 and housing 400 with the center plate 200.

As shown in FIGS. 1B, 6, in an embodiment, bolts 510 can be disposed through apertures 520. The cross-sectional shape of apertures 520 may be circular, oblong, curved oblong, or the like. The arc of the curved oblong aperture 520 can curve about a capstan central axis 672 which extends laterally through a capstan center point 670. The arc of the curved oblong aperture 520 can also correspond with the arc of the circular perimeter 570 of the support 500, or with the arc of the fourth section of the center plate 264. Each of the curved oblong apertures 520 can arc through an angle of between 5° to 80° with a preferred embodiment having an arc of 30° to 40°. In an embodiment, apertures 520 can form a complete circular channel extending through 360° about the capstan central axis 672. Advantageously, apertures 520 can be configured to allow the angle of the support 500, and corresponding receiver 550 and support arms 800, to be adjustable along a longitudinal vertical plane, relative to the center plate 200. This allows a user to adjust the angle of the drill 700 relative to the angle of the line to achieve optimum ergonomic positioning, increased stability, and/or allows the drill powered wire puller 100 to be operated in confined spaces, as discussed herein.

In an embodiment, the drill powered wire puller 100 may be coupled with a battery powered hand drill 700 using strap 710. Strap 710 can be an elastic O-ring made from rubber such as ethylene propylene diene monomer (EPDM), neoprene, nitrile, silicone rubber or the like. It will be appreciated that other materials may be suitable for encircling a proximal edge of the handle of the handheld power drill 700, and fall within the scope of the present invention. Strap 710 can be designed to engage each of first and second hooks 330, 340 of the cradle 300 and provide sufficient tension against a proximal side of the drill 700 to securely couple the drill handle within the U-shaped notch 310 of the cradle 300. Advantageously, this allows a user to quickly connect and disconnect a variety of differently shaped handheld drills 700 to the drill powered wire puller 100 without the need for any tools and provides increased ease of use and efficiency. In an embodiment, apertures 220 can include an oblong cross-sectional shape. Advantageously, this allows the cradle 300 to be adjusted relative to the center plate 200 along a longitudinal axis. This further allows the drill powered wire puller 100 to be adapted to differently sized drills.

In an embodiment, capstan 600 can include screw apertures 620. Apertures 620 can be disposed on a left most surface of the capstan drum 605 or on side surface of the capstan drum 605, orthogonal to the central axis of the capstan 672. Each of apertures 620 can receive a bolt or set screw for coupling the capstan 600 to a capstan axle (not shown). The capstan axle can in turn be coupled with the gear mechanisms disposed in housing 400. The portion of capstan axle disposed within the capstan 600 can include a flattened surface along a lateral axis. The flattened surface of the capstan axle allows the set screws to securely engage the capstan axle and transfer the rotational movement from the capstan axle to capstan.

In an embodiment, at least one of the apertures 620 aligns with an aperture in the capstan axle. The aperture in the capstan axle is orientated normal to the capstan central axis 672 and can traverse the axle to align with a corresponding capstan aperture 620 on an opposite side of the capstan central axis 672. Optionally, the capstan aperture 620 can entirely traverse the diameter of the capstan drum 605. The capstan aperture 620 and corresponding capstan axle aperture can align and be configured to receive a tension pin. In a preferred embodiment, the tension pin can be made of hardened steel, although it will be appreciated that other materials that display suitable physical and mechanical properties also fall within the scope of the present invention. The tension pin can be disposed through aperture 620 and through the capstan axle aperture. Once disposed through these apertures, the sprung tension pin expands against the walls of the apertures, thereby securely coupling the capstan 600 to the capstan axle. Advantageously this tension pin securement system may only require a single capstan aperture 620 and a single tension pin to secure the capstan to the capstan axle. Further, the single tension pin securement can be positioned towards an outer, left most end of the capstan, for example at aperture 620a. This allows for a simplified construction and increased efficiency in manufacturing of the drill powered wire puller 100. This also allows for the tension pin securement to be positioned away from the radial curved portion 610 of the capstan providing a smooth surface for receiving the line. Further still, the tension pin securement can couple with a capstan axle that is circular in cross section, and does not require a flattened side portion of the capstan axle. As such, the weight distribution of the capstan axle remains equal and reduces vibrations at high rotational speeds. Further, the capstan axle maintains greater rigidity and strength since no material is removed to create a flattened side, this in turn results in increased manufacturing efficiency. The tension pin securement is also configured to maintain a secure attachment under greater rotational and vibrational forces during use. The tension pin is configured to resist a sheer force between the capstan axle and the capstan 600 to maintain secure attachment therewith. With increased capstan revolutionary speed, there is a greater sheer force exerted on the tension pin which in turn ensures greater securement of the tension pin within aperture 620. Accordingly, the forces involved with the configuration of the tension pin securement system advantageously complement each other by providing greater securement at higher rotational speeds.

In an embodiment, receiver 550 is configured to couple with various support arms 800. Exemplary support arms 810, 820, 830, 840 are shown in FIGS. 9-12D. Support arms 800 can be configured for various uses including supporting the drill powered wire puller 100 against a surface to counteract the resistance of the line and increase stability for the user. Support arms 800 can also include one or more pulleys or low resistance line guides or channels for guiding the line on to the capstan.

In an embodiment the receiver 550 can include a securement pin 804 for securing the support arms 800 to the receiver 550. The securement pin 804 can include a pull ring, and a ball detent, pin detent or similar mechanism that secures the securing pin 804 within the securing aperture 806. This quick release securement pin facilitates exchange of different support arms and allows for increased efficiency and ease of use. It will be appreciated that the securement aperture 806 may traverse the support arms 800 along a lateral or transverse axis, or both. Accordingly, the orientation of the support arm may be rotated about the longitudinal axis at 90° increments. In an embodiment, a portion of the support arms 800, may define a substantially circular or polygonal cross-section and further include additional securement apertures 806 such that the support arms 800 may be orientated about the longitudinal axis at increments other than 90°.

As shown in FIG. 9, in an embodiment, support arm 810 can extend from a distal end of the receiver 550 and can include a support footing 802 at a distal end of the support arm 810. The support 810 arm may be formed as a single piece from milled aluminum or similarly suitable material, as discussed herein. The support arm can extend distally along a longitudinal axis. In an embodiment the support arm extends between 6" and 36" from the distal most point of the receiver 550 with a preferred embodiment extending substantially 18" from the distal most point of the receiver 550. Optionally the support arm 810 may include one or more inflection points 808 that provide portions of the support arm 810 that are angled relative to an axis of the drill powered wire puller 100. Advantageously the support arm 810 can be configured to provide a support footing rigidly coupled with the drill powered wire puller 100 that can be position proximate the source of the line being pulled, without impeding the travel path for the line.

As shown in FIG. 10A, in an embodiment of the disclosure, support arm 820 can include a spool 822 disposed at a distal end or anywhere along the length of the support arm 820. The spool 822 can be configured to receive the line from a source that is positioned at an angle to longitudinal axis of the drill powered wire puller 100. The spool 822 can then direct the line onto the capstan 600. Optionally, support arm 820 may include notches 824 to allow one or more spools 822 to be located at different positions along the length of the support arm 820. Spool 822 may include a securement pin 804 to allow for quick and easy reconfiguration of the spool 822 position.

Figure 10B:
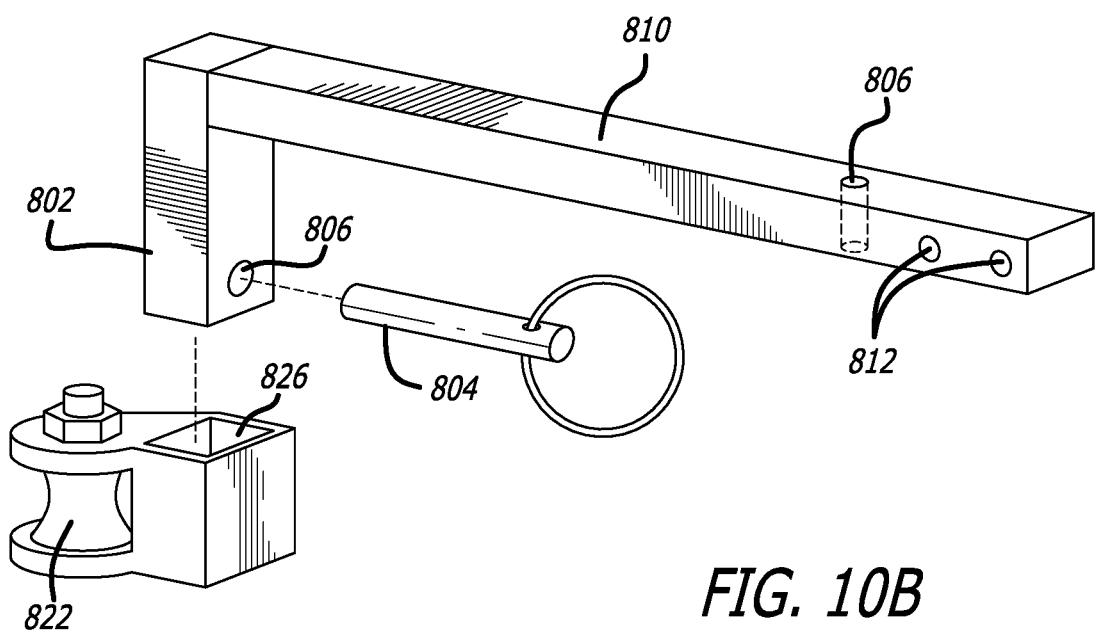
FIGS. 10B-C are exemplary views of an apparatus of a support arm.
Figure 10C:
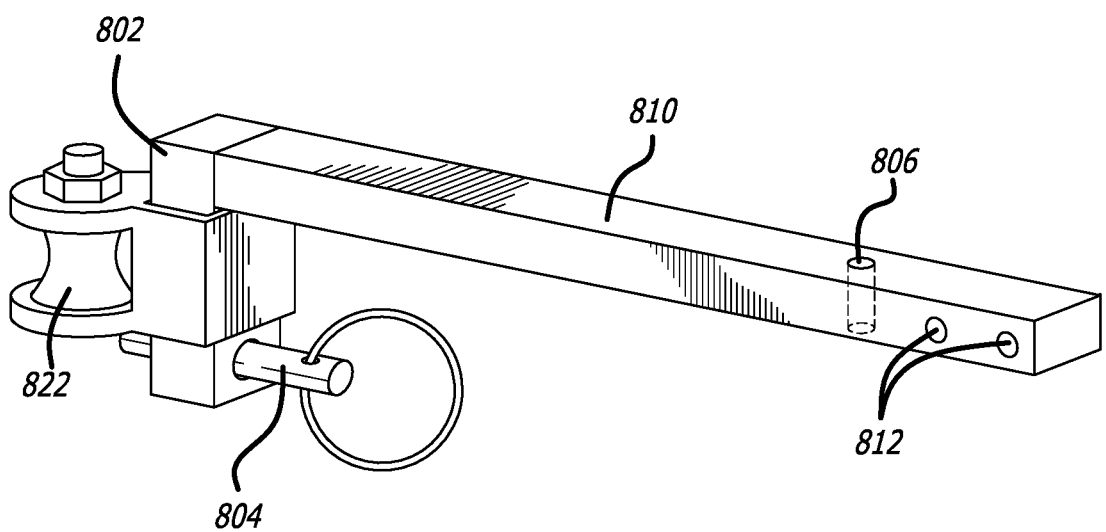

As shown in FIGS. 10B-10C, in an embodiment, support arm 810 can include both a support footing 802 and a spool 822. The spool 822 can include an aperture 826 which is configured to receive a portion of the support footing 802 and secured thereto with a securement pin 804, as discussed herein. The spool aperture 826 can include a square cross-sectional shape which is commensurate with the cross-sectional shape of the support footing 802, although it will be appreciated that other cross-sectional shapes fall within the scope of the present invention. Advantageously, the support arm 810 can be quickly adapted to either support the wire puller 100, and/or provide a line guide, with minimal additional equipment.

Figure 11A:
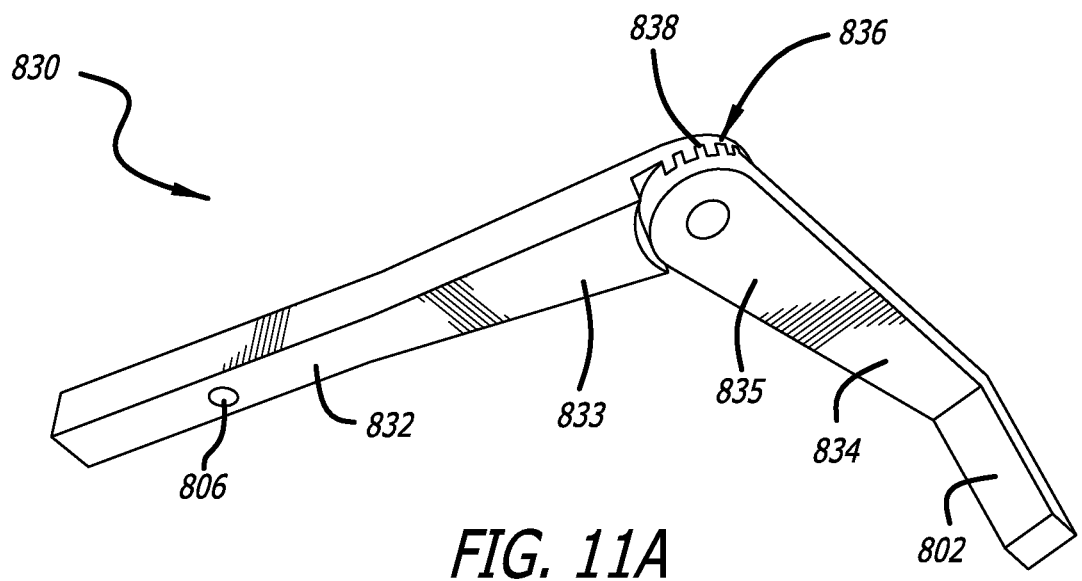
FIGS. 11A-B are exemplary views of an apparatus of a support arm.
Figure 11B:
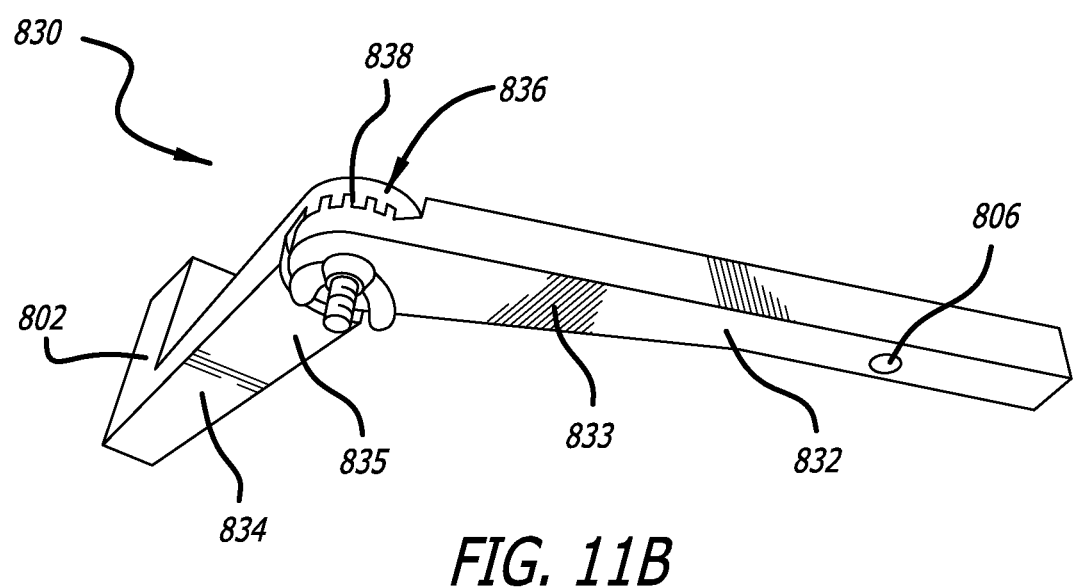

As shown in FIGS. 11A-11B, in an embodiment, support arm 830 can include a first portion 832 and a second portion 834 coupled together with an articulated joint 836. The articulated joint 836 can be adjusted and secured in place using a bolt and wing nut or similar fastener known in the art. The support arm 830 can be secured to the receiver 550 using a securement pin 804 and securement aperture 806, as discussed herein. The support arm 830 can include a support footing 802 and/or spool 822 at a distal end, as discussed herein. The first portion 832 can be coupled with the receiver 550 and angled parallel with an axis of the receiver 550. A user can then adjust the articulated joint 836 such that the second portion 834 is at an angle relative to an axis defined by the first portion 832. Accordingly, as discussed herein, a user may adjust the wire puller 100 by adjusting the articulated joint 836, the rotational position of the first portion 832 within the receiver 550, and the angle of the receiver 550 relative to the center plate 200, to position the support footing 802 adjacent the source of the line being pulled. This provides maximum stability to the wire puller 100 while positioning the handheld drill 700 in an ergonomically correct position. Further, the support arm 830 can be angled to fit within confined spaces while maintaining a clear travel path for the line between the source and the capstan 600.

In an embodiment, the first and second portions 832, 834 can include a tapered shape 833, 835 such that a width of each of the first and second portions 832, 834 increases proximate the articulated joint 836. The width of the first and second portions 832, 834 increases along an axis that runs parallel with the direction of articulation of the articulated joint 836. Advantageously, these tapered portions 833, 835 add increased strength and stability along a plane that is parallel with the position of the support footing 802, and is therefore commensurate with direction of resistance from the line. In an embodiment, the articulated joint 836 can include gears, teeth, detents, or ridges, such as teeth 838, on each of the first and second portions 832, 834. These teeth 838 can interlock to prevent slippage of the articulated joint when it is fastened at the desired angle.

Figure 12A:
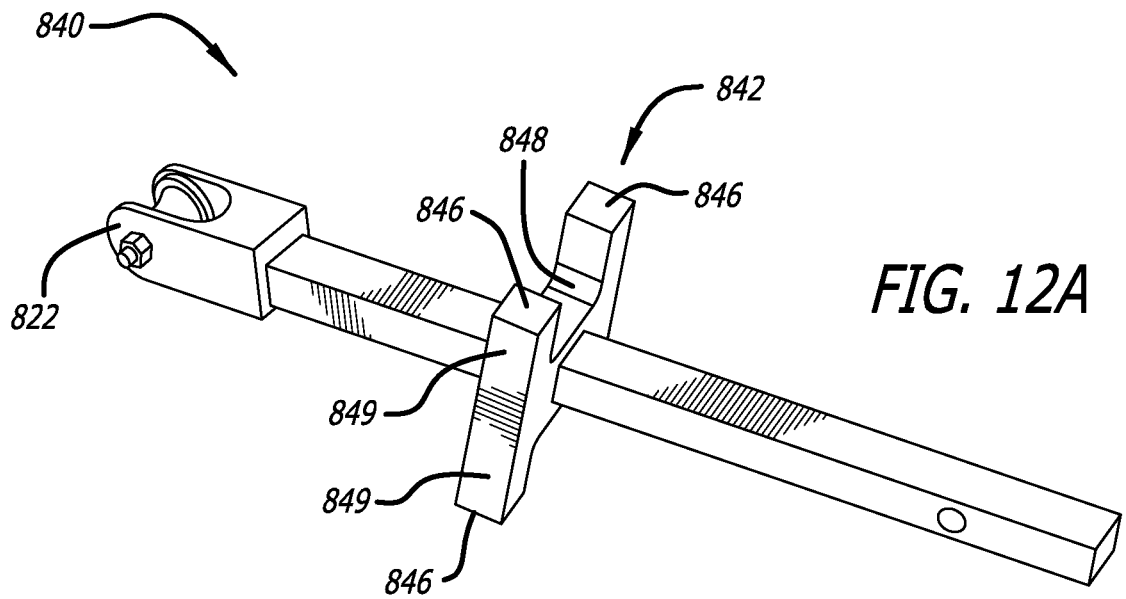
FIGS. 12A-D are exemplary views of an apparatus of a support arm.
Figure 12B:
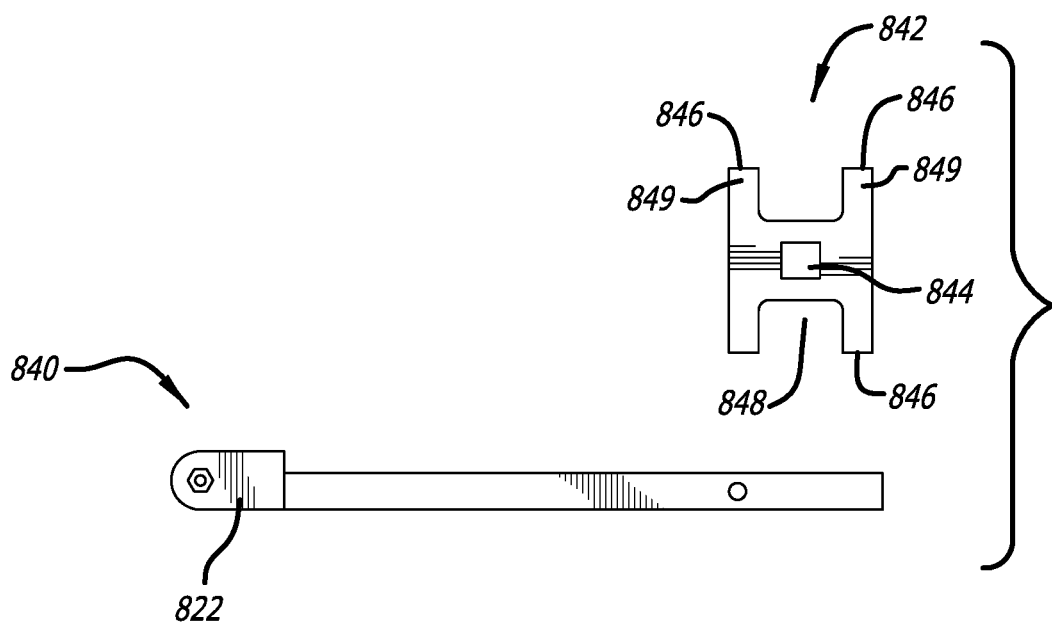
Figure 12C:
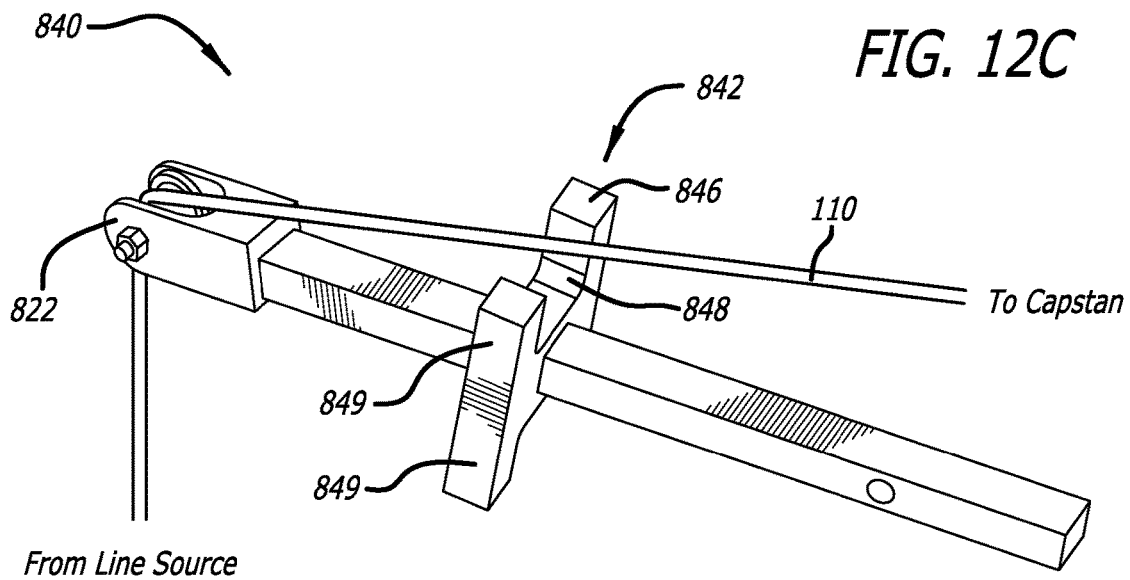
Figure 12D:
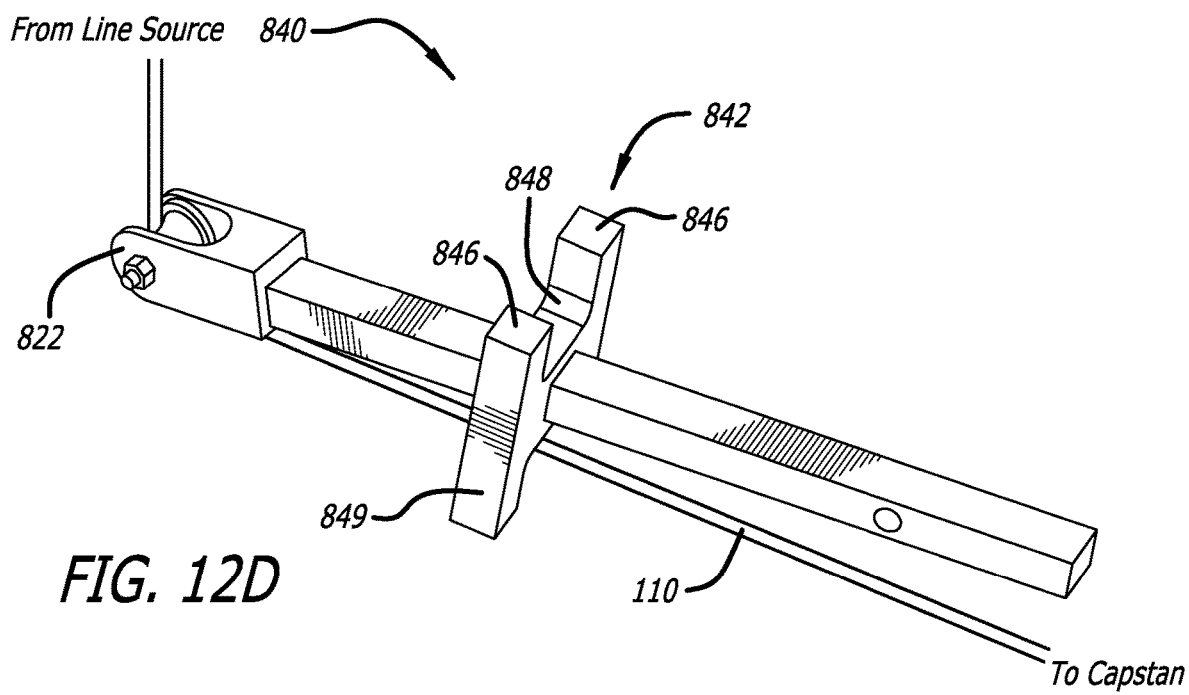

As shown in FIGS. 12A-12D, in an embodiment, support arm 840 can further include a mount to maintain positioning of the support arm 840. As used herein, one embodiment of a mount corresponds to a H-block attachment 842, as described below. The H-block 842 can include an aperture 844, feet 846, and notches 848. The aperture 844 defines a cross-sectional shape that is commensurate with the cross-sectional shape of the support arm 840 such that the support arm 840 can extend through the aperture 844 prior to being coupled with the receiver 550. In this way, the H-block 842 can be slidably coupled with the support arm 840. Support arm 840 can further include a spool 822 or support footing 802, for example spool 822 disposed at a distal end. As shown in FIGS. 12C-D, the support arm 840, with H-block 842 slidably coupled thereto, can receive a line at an angle perpendicular to the longitudinal axis of the drill powered wire puller 100. The line can be fed through the spool 822 to align the travel path on to the capstan 600, as discussed herein. Advantageously, the H-block 842 can be rested against a surface to stabilize the wire puller 100 relative to the direction of force that is perpendicular to the wire puller longitudinal axis. Further, the H-block 842 raises the spool 822 clear of any resting surface and allows free running of the spool 822. Since the H-block 842 is slidably coupled with the support arm 840, the position of the H-block 842 relative to the spool 822, can be quickly and easily adjusted to modify the angle and/or position of the support arm 840, spool 822, or combinations thereof, relative to the angle of the line.

As shown in FIGS. 12C-12D, in an embodiment, the feet 846 are off set from the travel path of the line. Advantageously, this allows a clear, unobstructed travel path for the line 110 from the spool 822 through the notch 848 and on to the capstan 600. In an embodiment, the bilateral symmetry of the mount allows the support arm 840 to receive a line from a direction which is substantially normal to the longitudinal axis of the drill powered wire puller 100. For example, as shown in FIG. 12C, a line may be received from underneath the drill powered wire puller 100. As such, a user may fit the support arm 840 to the receiver 550 with the H-block 842 slidably engaged as discussed herein. The user may then position the feet 846 upon a supporting surface which is below H-block 842, such that the spool 822 is positioned over the source of the line. The travel path for the line 110 may then be directed up over the spool 822, between the notch 848 and onto the capstan 600.

As shown in FIG. 12D, in an embodiment, a line may also be received from an opposite side, above the drill powered wire puller 100. As such a supporting surface may only be found on the opposite side of the wire puller 100 from the source of the line. In this case a user may fit the support arm 840 to the receiver 550 with the H-block 842 slidably engaged as discussed herein. The user may then position the feet 846 upon a supporting surface that is on an opposite side from the direction of resistive force from the line. A user can adjust the position of the H-block 842, spool 822, as discussed herein. A user can then apply an opposing, downward force to the support arm 840, or wire puller 100, to stabilize the wire puller 100 against the supporting surface. The notch 848 can advantageously still allow a clear travel path 110 from the spool 822 to the capstan 600, between the H-block 842 and the supporting surface, by allowing the line to travel through notch 848. It will be appreciated that the upward and downward directions used herein are exemplary and are interchangeable.

In an embodiment, the length of the legs 849 are between 1" and 10" with a preferred embodiment having a length of 3.5". It will be appreciated that H-block 842 may also have legs 849 that can extend much longer and also fall within the scope. It is also contemplated that the legs 849 may be coupled with additional extension legs (not shown) that allow the H-block 842 to be positioned at an appropriate position. In a non-limiting example, if there is no support surface proximate the source of the line, H-block 842 may include, or be coupled with, legs that are approximately four feet long such that a user may stabilize the wire puller 100 against the floor while maintaining a comfortable standing position.

Figure 13:
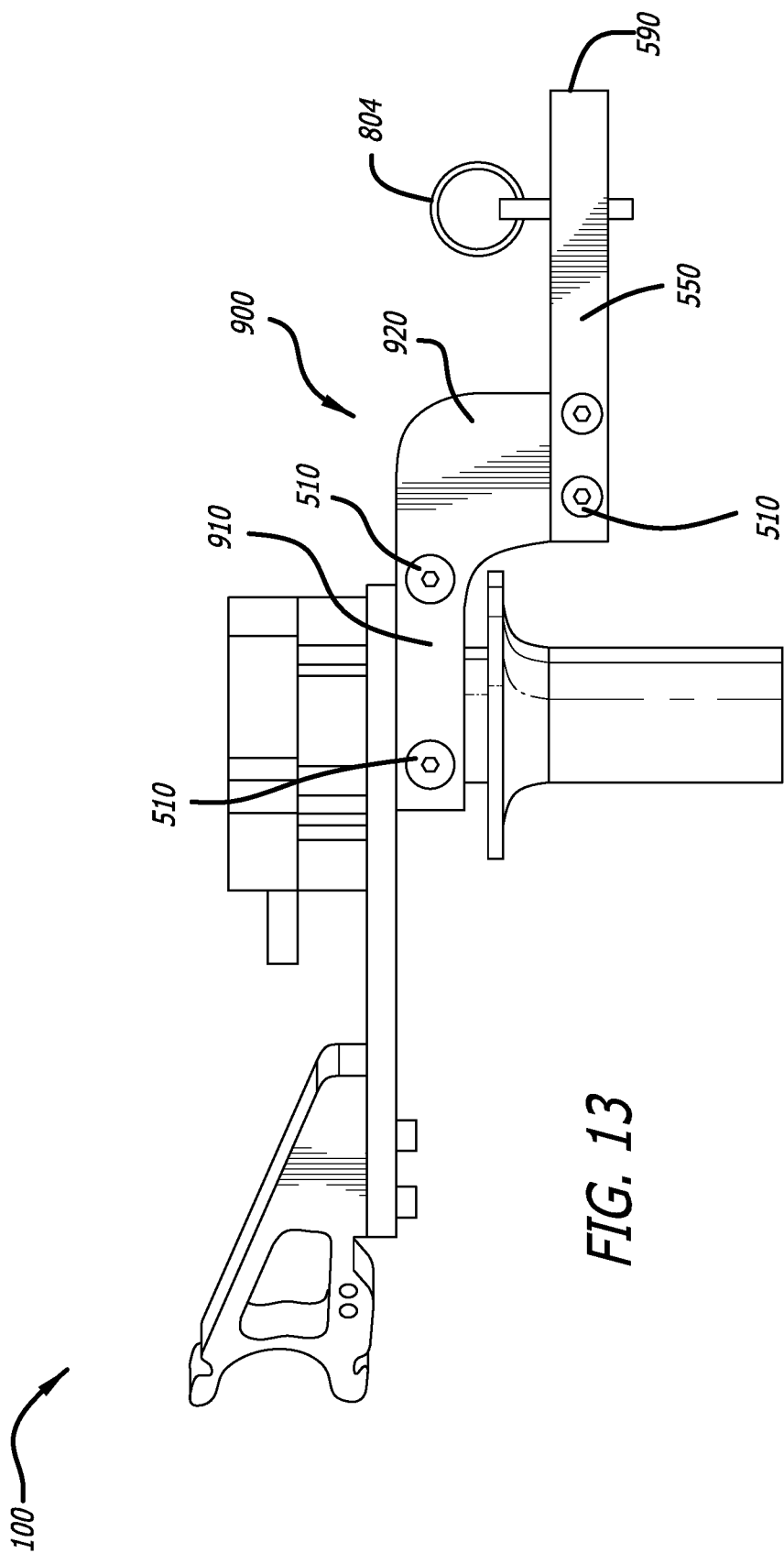
FIG. 13 is an underside view of an embodiment of a drill powered wire puller.

As shown in FIG. 13, in an embodiment, drill powered wire puller 100 can include an off-set receiver bracket 900 configured to couple with support arms 800 as discussed herein. The off-set receiver bracket 900 includes a first portion 910 and a second portion 920. The first portion 910 is configured to be attached to a lower surface 580 of the support 500 using bolts 510. The first portion 910 can extend from the support 500, longitudinally and distally beyond a distal most edge of the capstan 600. A second portion 920 can extend laterally from a distal end of the first portion 910, in the direction of the capstan 600, such that the second portion 920 extends in front of the capstan 600. The second portion 920 can be coupled with a receiver 550. The receiver 550 can extend substantially along a longitudinal axis and can couple with support arms 800 as discussed herein. An axis defined by the receiver 550 can align with the radially curved portion 610 of the capstan 600. The receiver 550 can define an opening 590 with a square cross section and can include a securement aperture 806 for receiving a securement pin 804, as discussed herein. It will be appreciated that the cross section of the receiver 550 can define circular or other polygonal cross-shapes that are commensurate with the cross-sectional shape of a support arm 800, or capable of securely receiving a cross-sectional shape of a support arm 800, as discussed herein. In an embodiment, support arms 800 can couple directly with the second portion 920, without the need for receiver 550, and align with the radially curved portion 610 of the capstan 600 in a similar way to the receiver 550. Support arms 800 can couple directly with the second portion 920 using bolts 510 or similar fasteners known in the art.

In an embodiment, the first portion 910, second portion 920, and receiver 550 can be made from a single monolithic piece or from separate pieces that are fastened together using bolts, welding, adhesive or similar fastenings known in the art, or combinations thereof. For example, as shown in FIG. 13 the first portion 910, second portion 920 are made from a monolithic piece, while receiver 550 is fastened thereto using bolts 510.

Advantageously, the first portion 910, second portion 920, and receiver 550 are configured to align the receiver 550, and associated support arm 800, with the optimum receiving point on the capstan 600, which is adjacent the radially curved portion 610 of the capstan 600. Further, an elbow created by the first and second portions 910, 920 is positioned close to the capstan 600, which increases strength and stability of the support arm 800. The configuration of the off-set receiver bracket 900 also allows the travel path of the line to run parallel with the longitudinal axis of the support arm 800. This reduces lateral or transverse forces on the support arm 800 and further increases strength and stability.

Method of Use Illustrative Example

In an exemplary method of use, a powered rotary tool, such as a battery powered handheld drill 700 may be coupled with the drill powered wire puller 100. The U-shaped notch 310 may receive the handle of the drill 700 and a strap 710 can couple with hooks 330, 340 to encircle the handle of the drill 700 and secure it to the drill powered wire puller 100. The drill chuck 730 can couple with the housing axle 430. Cradle 300 can be adjusted relative to the center plate 200 to further ensure correct alignment of the drill 700 with the wire puller 100. Support 500 can be adjusted about a capstan central axis 672 to ensure correct alignment of the support arm 800 which is coupled with receiver tube 550.

Depending on the location of the source of the line to be pulled, wire puller 100 can be fitted with a various support arms 800, for example support arms 810, 820, 830, 840, etc. each of which can be configured to support the wire puller 100 relative to the direction of resistive force from the line to be pulled and can direct the travel path of the line on to the capstan 600. A line can then be taken from the source, for example a junction box, and fed through any associated channel guides or spools 822 of the support arm 800 and wound around the capstan several times to ensure there is sufficient frictional forces to between the line and the capstan 600. Optionally the line may be wound through notches 650 to ensure a secure attachment between the line and the capstan 600.

Drill 700 can be actuated by a user which causes the capstan 600 turn at a ratio of 1:0.5, winding the line on to the capstan 600. The speed of the winding can be varied by modifying the speed of the drill. The support arm 800, and support 550 can be adjusted to feed the line on to the capstan 600 adjacent the radially curved portion of the capstan 600.

Illustrative Embodiments of Drill Powered Wire Puller Attachments

Figure 14A:
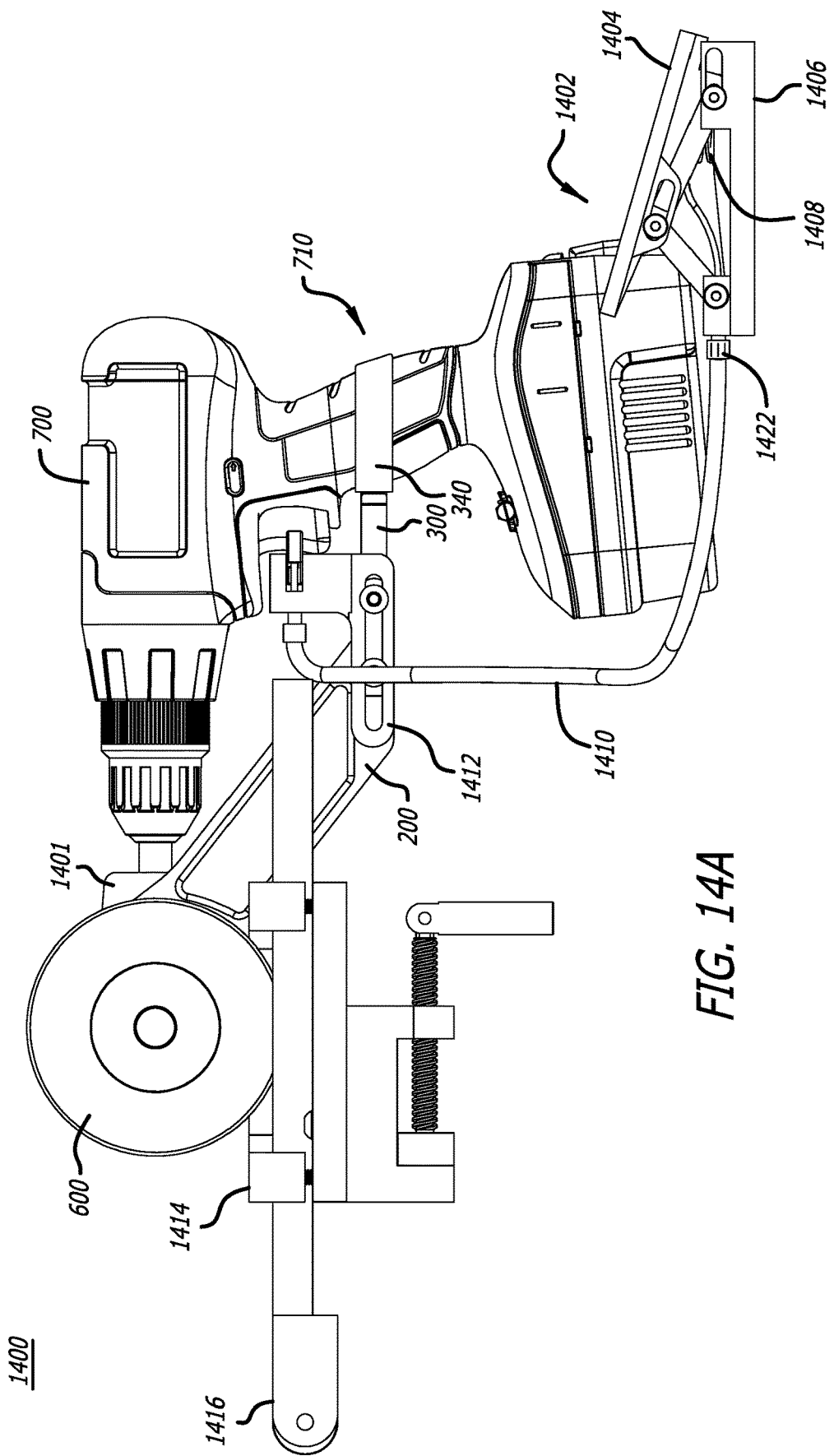
FIG. 14A is a right-side view of a drill powered wire puller including a plurality of optional attachments.

Referring to FIG. 14A, a right-side view of a drill powered wire puller including a plurality of optional attachments is shown. An exemplary apparatus operating as a drill powered wire puller 1400 is shown in FIG. 14A that is similar to the drill powered wire puller 100 of FIGS. 1-13. For instance, the drill powered wire puller 1400 may feature components including the center plate 200, the cradle plate 300, the housing 400, the support 500 and the capstan 600 as discussed above. As will be discussed in detail below, the drill powered wire puller 1400 includes one or more of a plurality of optional attachments configured to improve operability as compared to the drill powered wire puller 100.

As in illustrated in FIG. 14A, in addition to the components discussed above with respect to FIGS. 1-13, the drill powered wire puller 1400 may include: a foot pedal system 1402 that includes a foot pedal 1404, a base 1406 and a spring 1408, a throttle cable sheath 1410 encapsulating a throttle cable 1420; a trigger assembly 1412; a wire puller vise 1414; and a roller arm 1416. In some embodiments, the reference number 1408 may refer to a spring-loaded component as opposed to directly referencing a spring.

As discussed above with various embodiments of the disclosure, the center plate 200 extends along a plane defined by the longitudinal and transverse axes and is coupled at a proximal end with a cradle plate 300. The cradle plate 300 extends along a plane substantially perpendicular to the center plate 200, defined by the longitudinal and lateral axes. The cradle plate 300 may be coupled to the center plate 200 using one or more socket cap bolts 210, as shown in FIG. 3. As shown in FIG. 14A, the trigger assembly is coupled to one or more of the center plate 200 and the cradle plate 300 using one or more socket cap bolts 1418. In some embodiments, the trigger assembly may be coupled to one or more of the center plate 200 and the cradle plate 300 using the cap bolts 210. The trigger assembly 1412 is utilized to provide for ease in operating the trigger of the power drill 700. Specifically, various trigger assembly embodiments discussed below provide for hands-free operation of the trigger and remote-controlled operation thereof. Additional details and operations of the trigger assembly embodiments will be discussed below with respect to, inter alia, FIGS. 16A-16D.

The foot pedal system 1402 is communicatively coupled to the trigger assembly 1412 via the throttle cable 1420. The foot pedal system 1402 enables hands-free operation of the power drill 700, and consequently, the drill powered wire puller 1400. The foot pedal system 1402 is comprised of the foot pedal 1404, the base 1406, a spring 1408 and a throttle cable adjustment screw 1422.

In some embodiments, the foot pedal system 1402 operates to create tension with the throttle cable 1420 in response to receipt of pressure on the foot pedal 1404. By providing tension on the throttle cable 1420, a trigger actuator 1600 (FIG. 16A) is rotated to provide pressure to and depress the trigger of the power drill 700. Further, release of the pressure on the foot pedal 1404 releases the tension on the throttle cable 1420 causing counter-rotation of the trigger actuator 160, thereby releasing pressure on the trigger. The trigger of the power drill 700 may be operated using varying pressure on the foot pedal 1404. The varying pressure applied to the foot pedal 1404 results in varying pressure being applied to the trigger thereby controlling intensity at which the drill head spins. The throttle cable adjustment screw 1422 receives the throttle cable 1420, which passes through an aperture of the base 1406 and couples with the spring 1408. The throttle cable adjustment screw 1422 is configured to be manually rotated by a user, and in response to the rotation, alter the tension of the throttle cable 1420. Thus, the throttle cable adjustment screw 1422 enables a user to adjust the sensitivity of the foot pedal 1404 and tighten the throttle cable 1422 if the tension thereof decreases based on extended use for example. As is seen in FIG. 14A, the foot pedal 1402 is coupled to the base 1406 with a plurality of socket cap bolts.

Figure 14B:
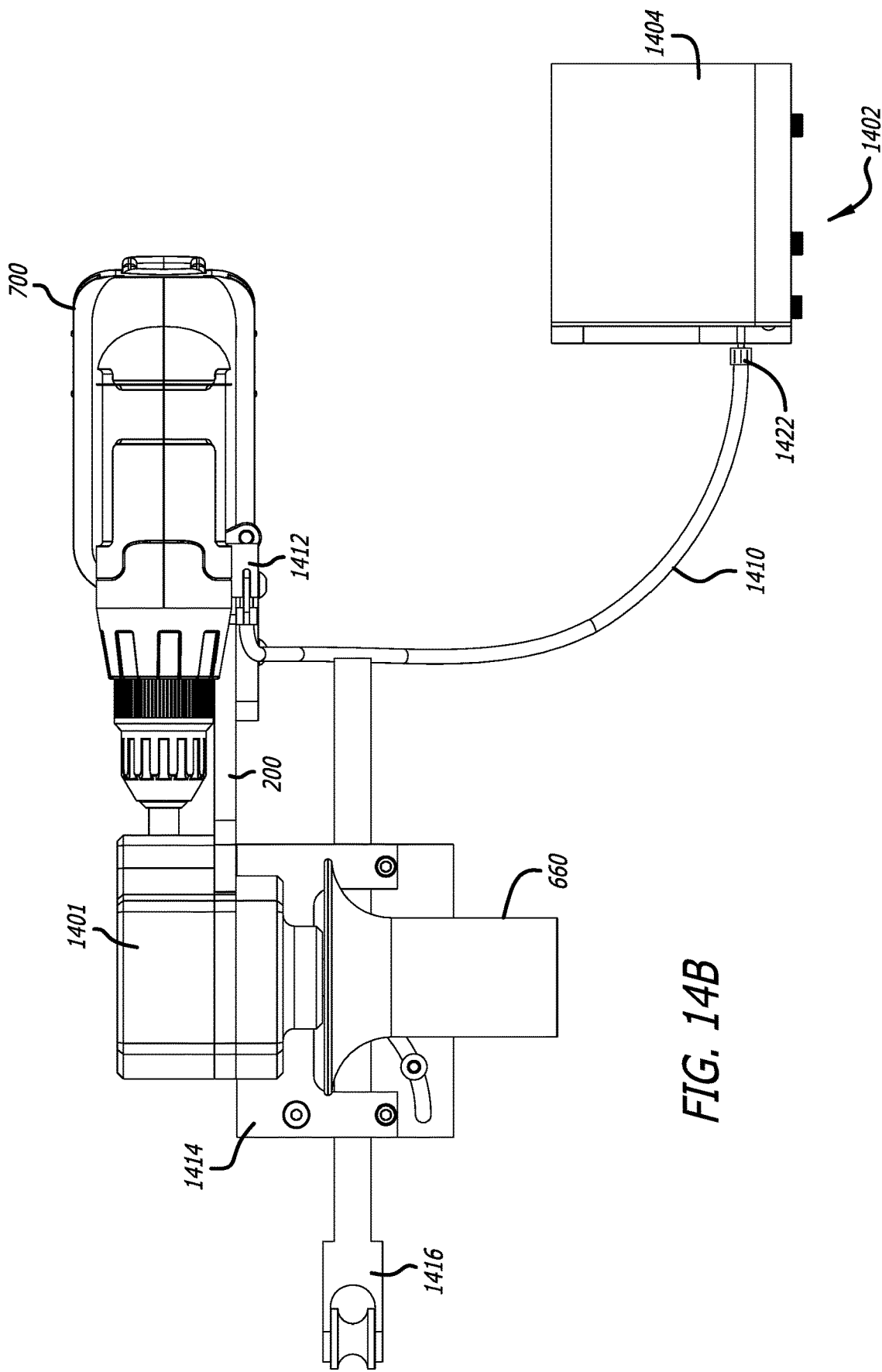
FIG. 14B is a top view of the drill powered wire puller including the plurality of optional attachments as seen in FIG. 14A.

Referring now to FIG. 14B, a top view of the drill powered wire puller including the plurality of optional attachments as seen in FIG. 14A is shown. The center plate 200 extends from the cradle plate 300 to couple with the housing 1401. The housing 1401 is coupled to a right (lateral) side of the center plate 200, adjacent a distal end, and extends along a lateral axis away from the center plate 200. The housing 1401 may take one of various shapes. As illustrated in FIG. 14B, the housing 1401 takes a rectangular shape; however, as illustrated in FIG. 2, the housing 400 is defined by a substantially circular shape. The housing 400 and the housing 1401 illustrate two of many embodiments of a housing component.

Figure 15:
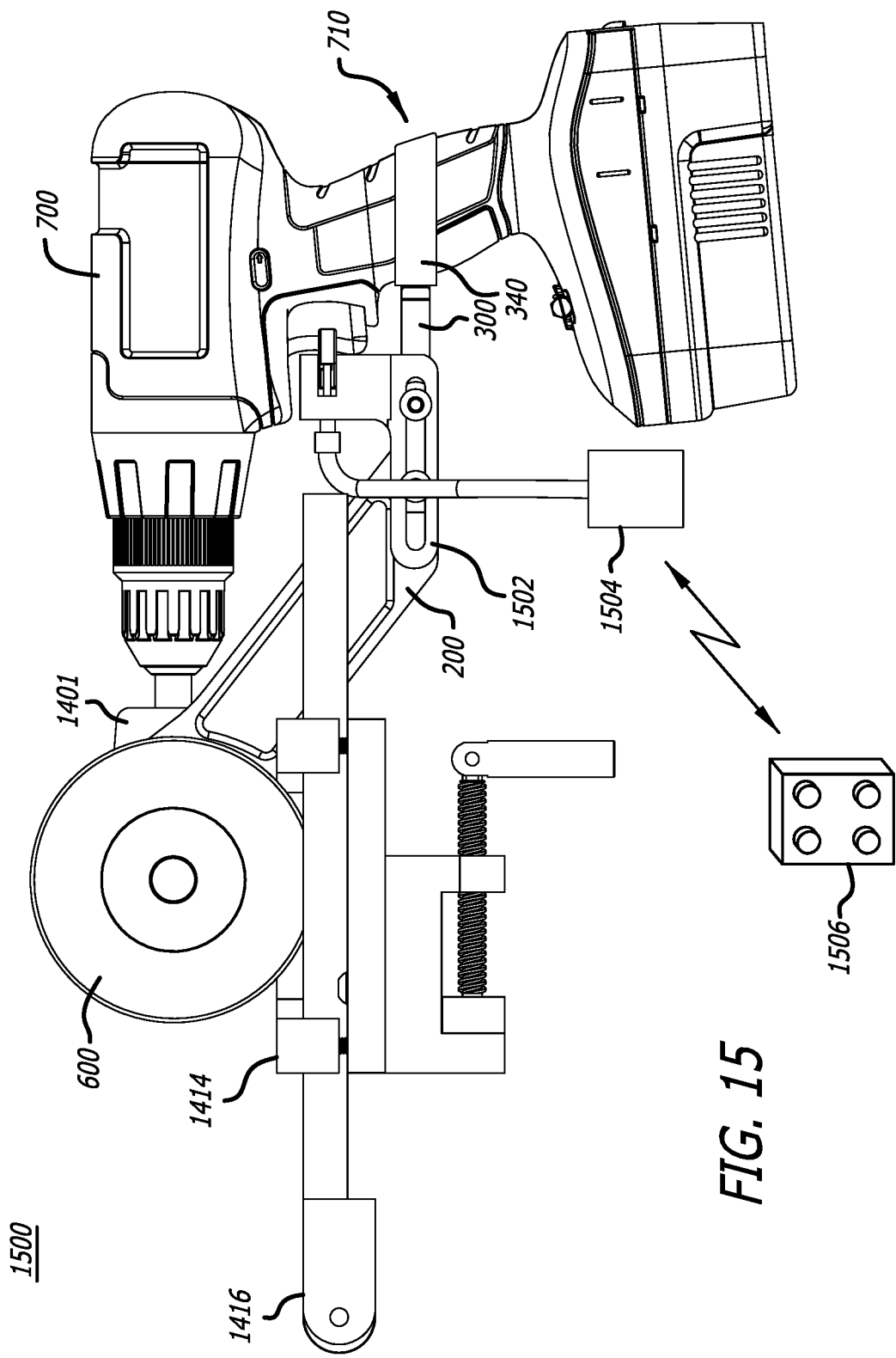
FIG. 15 is a right-side view of a drill powered wire puller including a second plurality of optional attachments.

As referenced above, a capstan 600 is included in the drill powered wire pullers 100 and also included in the drill powered wire puller 1400. In some embodiments, as shown in FIGS. 1A-10A, the capstan can extend laterally from a left side of a support 500. In other embodiments, the support 500 may be excluded and the capstan 600 may couple directly to the housing 1401 as shown in FIGS. 14A-15. As discussed above, the capstan 600 defines a substantially circular outer perimeter 660 about a capstan center point 670. A central axis 672 of the capstan 600 extends along a lateral axis through the capstan center point 670. The outer perimeter of the capstan 660 may optionally include notches 650 extending radially inward to define one or more "cleat" shapes in the outer perimeter as shown in FIGS. 1-10A; however, such notches are optional and need not be included as illustrated in FIGS. 14A-15. Additional aspects of the capstan 600 are discussed above.

In a similar manner as discussed above and illustrated in FIGS. 1A-1B, the wire pullers 100 and 1400 are configured for coupling to a powered rotary tool, such as a handheld power drill 700. The U-shaped notch 310 of the cradle plate 300, as seen in FIG. 4, can couple with a handle of the handheld power drill 700 via the hook 330-340, which receive the strap 710 that encircles a proximal edge of the handle of the handheld power drill 700.

Referring now to FIG. 15, a right-side view of a drill powered wire puller including a second plurality of optional attachments is shown. A drill powered wire puller 1500 is shown that includes many of the same components discussed above with respect to FIGS. 14A-14B. However, instead of the inclusion of the foot pedal system 1402 coupled to the trigger assembly 1412 via the throttle cable 1420, the drill powered wire puller 1500 includes a trigger assembly 1502, a wireless transceiver 1504 and a wireless remote 1506. The trigger assembly 1502 is configured to operate in a similar manner as the trigger assembly 1412 in that a trigger actuator is activated to provide pressure to and depress the trigger of the power drill 700. However, instead of activation resulting from pressure applied to a foot pedal 1404, the trigger assembly 1502 is controlled via wireless signals received by the transceiver 1504. The remote 1506 may transmit the wireless signals that are received by the transceiver 1504, which converts the wireless signals into electrical signals that control the operation of the trigger actuator. In such embodiments, the trigger assembly 1502 may include a system on chip (SOC) that receives the electrical signal and causes activation of a motor that rotates the trigger actuator. Each of the trigger assembly 1502, the transceiver 1504 and the remote 1506 may include a battery that supplies power enabling operation of each component.

Figure 16A:
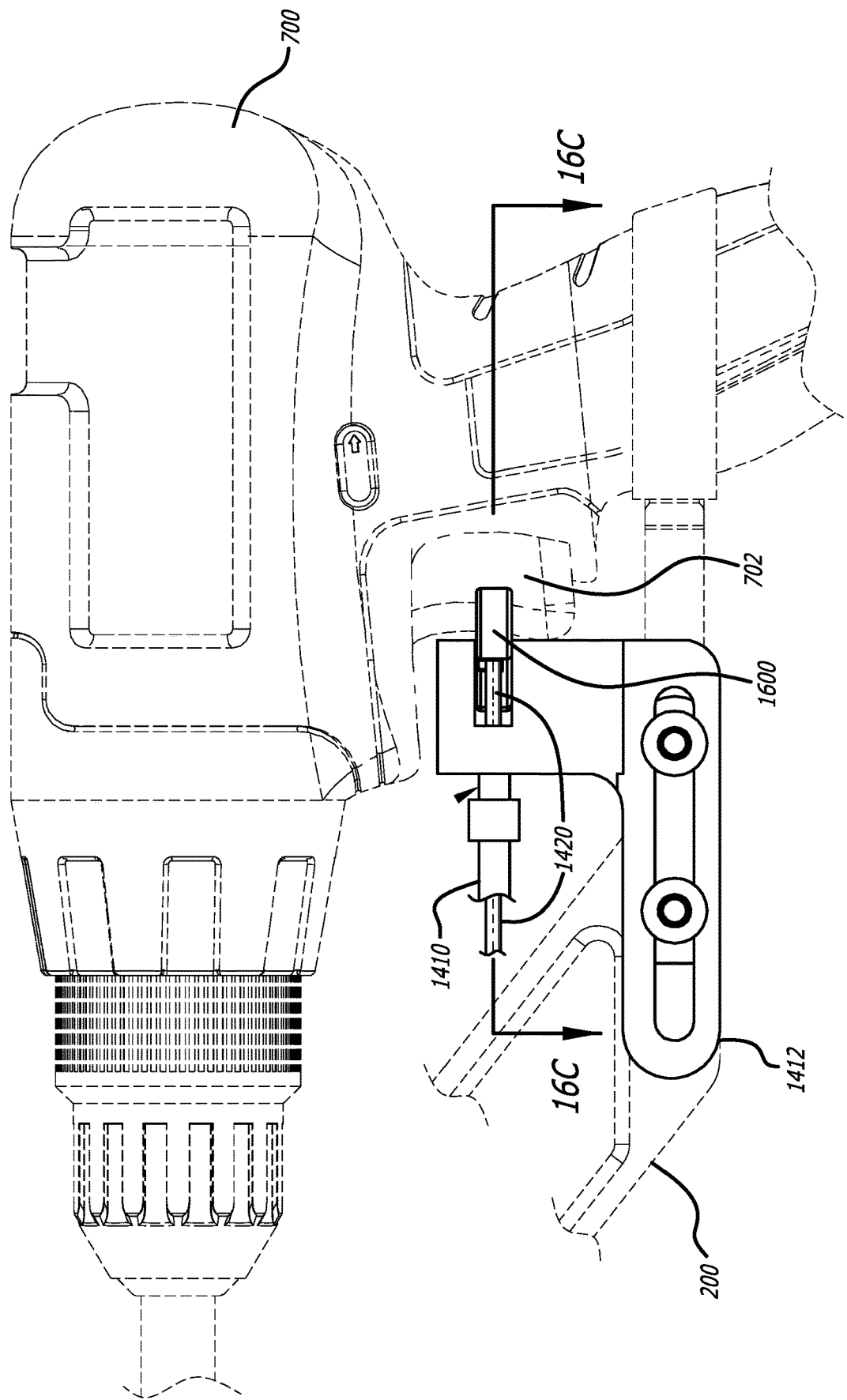
FIG. 16A is a right-side view of an embodiment of the trigger assembly of FIGS. 14A-14B coupled with a drill powered wire puller shown in an exemplary environment of use.
Figure 16B:
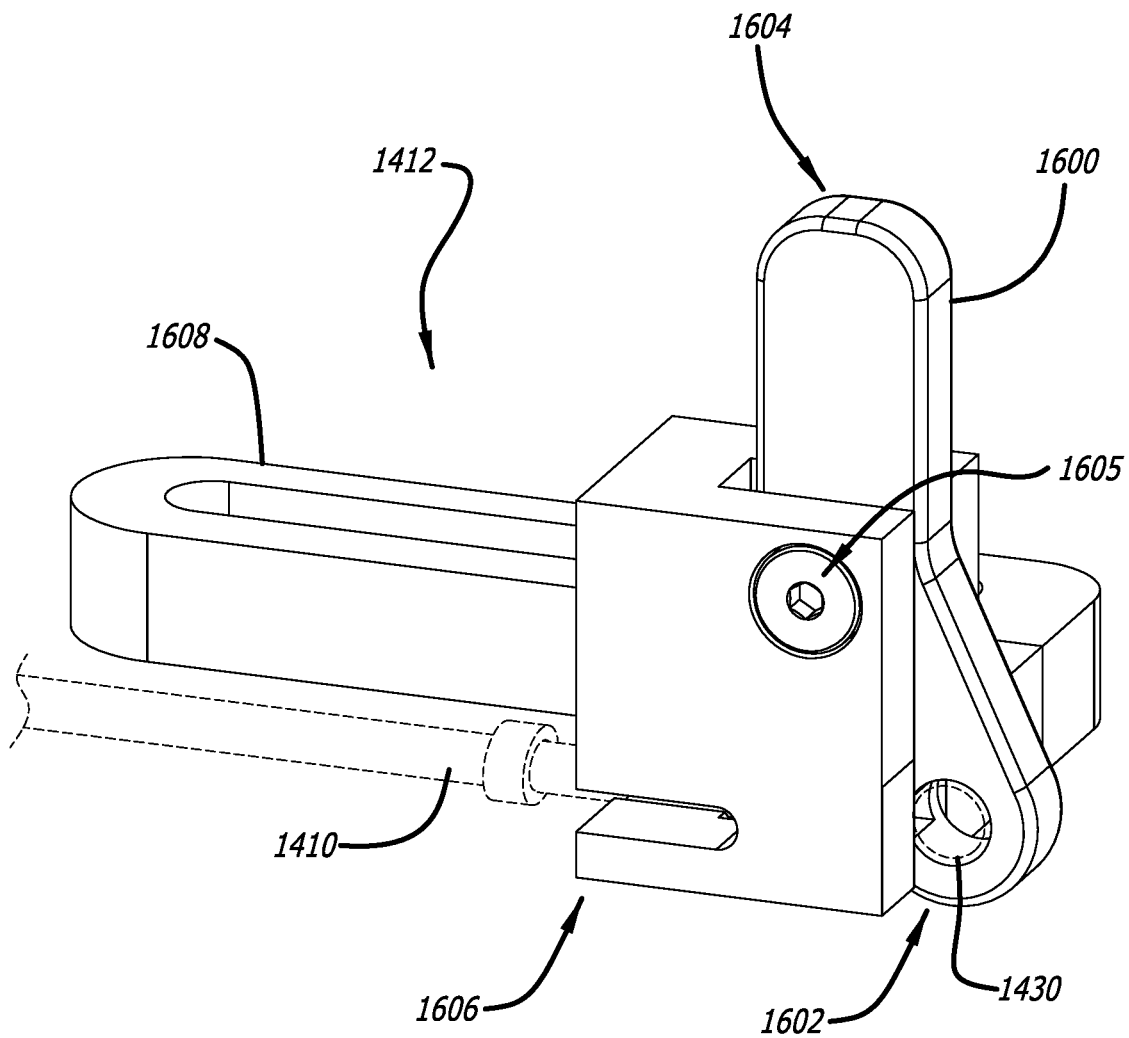
FIG. 16B is rear right-side perspective view of the trigger assembly of FIG. 16A.

Referring to FIG. 16A, a right-side view of an embodiment of the trigger assembly of FIGS. 14A-14B coupled with a drill powered wire puller shown in an exemplary environment of use is shown. For purposes of clarity, the trigger assembly 1412 is shown via solid lines while other components of the drill powered wire puller 1400 are shown via dotted lines. FIGS. 16A-16D provide detailed views of the trigger assembly 1412, with FIG. 16C providing a cross-sectional view of FIG. 16A at 16C-16C. The throttle cable 1420 is shown to be encapsulated by the throttle cable sheath 1410. The throttle cable 1420 passes through an aperture of the trigger assembly 1412 to couple with the trigger actuator 1600. As is shown in FIGS. 16B-16D, the coupling may be via a rounded end 1430 of the throttle cable 1420 located within a receptor of a first end 1604 of the trigger actuator 1600. For instance, the rounded end 1430 may be a circular circumference with two opposing, flat sides. In such an embodiment, the throttle cable 1420 may pass through an aperture in the first end 1602 as shown in FIGS. 16C-16D. As the rounded end 1430 has a larger circumference than the aperture through which the throttle cable 1420 passes, tension on the throttle cable 1420 originating from a distal end (i.e., from the foot pedal system 1402) pulls the throttle cable 1420 distally, which also pulls the first end 1602 of the trigger actuator causing rotation about a bolt 1605, such as a socket cap bolt, that serves as a transverse axis. As seen in FIG. 16D, rotation of trigger actuator 1600 causes the second end 1604 of the trigger actuator 1600 to provide pressure to and depress the trigger 702 of the power drill 700, thereby activating the power drill 700. Further, release of pressure on the foot pedal 1404 releases the tension in the throttle cable 1420 allowing counter-rotation of the trigger actuator 1600. The counter-rotation of the trigger actuator 1600 releases the pressure applied to the trigger 702.

Although discussed above as having a particular shape, it should be understood that the cable end 1430 of the cable 1420 may take alternative shapes, e.g., a spherical ball, a square, etc., with the receptor of the first end 1604 having a corresponding shape.

Referring to FIG. 16B, right back perspective view of the trigger assembly of FIG. 16A is shown. In detail, the trigger assembly 1412 is shown to include the trigger actuator 1600 having a first end 1602 and a second end 1604, wherein the first end 1602 includes a receptor configured to receive the cable end 1430. The trigger actuator 1600 is coupled to the body 1606 via a socket cap bolt 1605 that serves as a transverse axis of rotation for the trigger actuator 1600. Additionally, the trigger assembly 1412 includes a coupling arm 1608 configured to couple with the center plate 200 or the cradle 300 via on or more socket cap bolts or other fastening mechanism as shown in FIGS. 14A, 15 and 16.

Figure 17A:
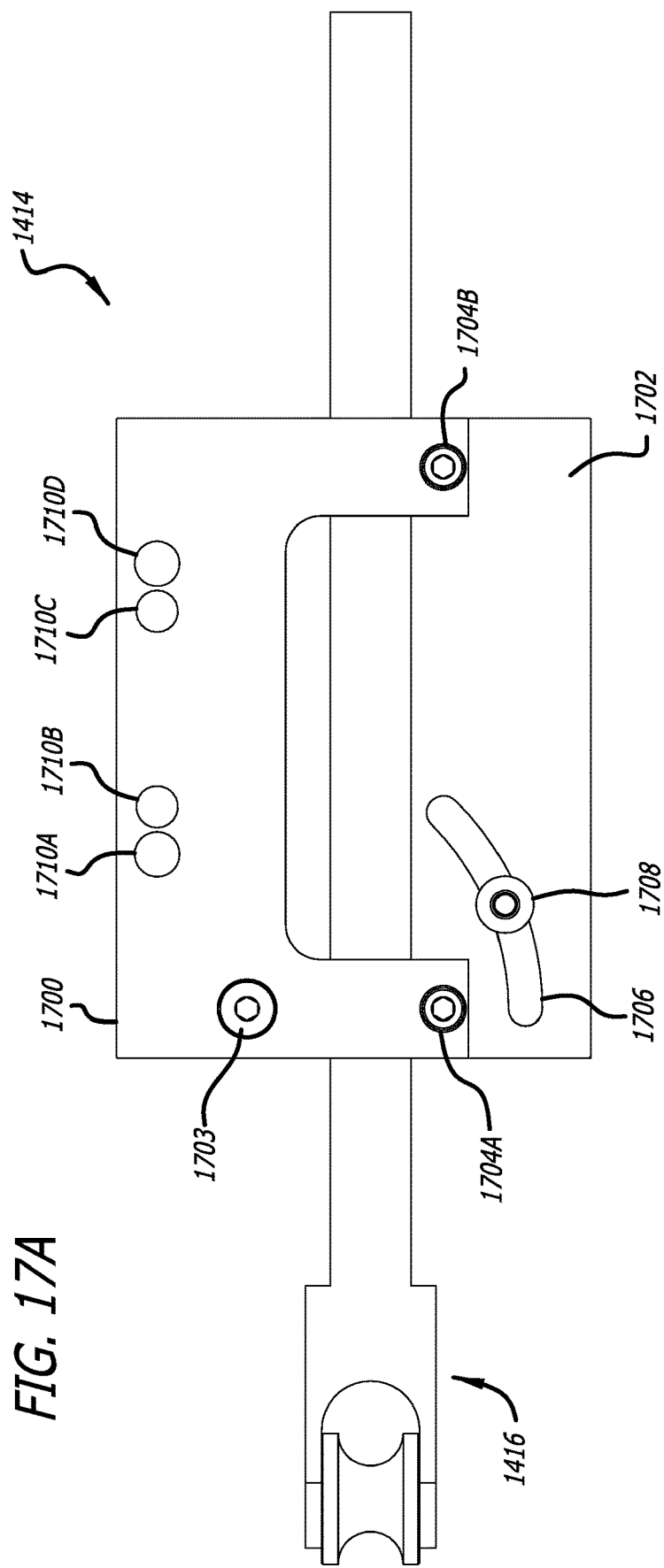
FIG. 17A is a top view of an embodiment of a wire puller vise coupled of FIGS. 14A-14B.

Referring to FIG. 17A, a top view of an embodiment of a wire puller vise coupled of FIGS. 14A-14B is shown. The wire puller vise 1414 includes a top plate 1700 coupled with a vise plate 1702 with the roller arm 1416 optionally received there between. Specifically, the top plate 1700 is coupled to the vise plate 1702 via a plurality of socket cap bolts 1703, 1704A-1704B. The wire puller vise 1414 may be coupled to the center plate 200 via one or more socket cap bolts secured into one or more of the apertures 1710A-1710D. It should be understood that the positioning and configuration of any of the apertures for coupling the wire puller vise 1414 to the center plate 202 and/or for coupling the top plate 1700 to the vise plate 1702 may vary from the embodiment illustrated in FIGS. 17A-17B.

Figure 17B:
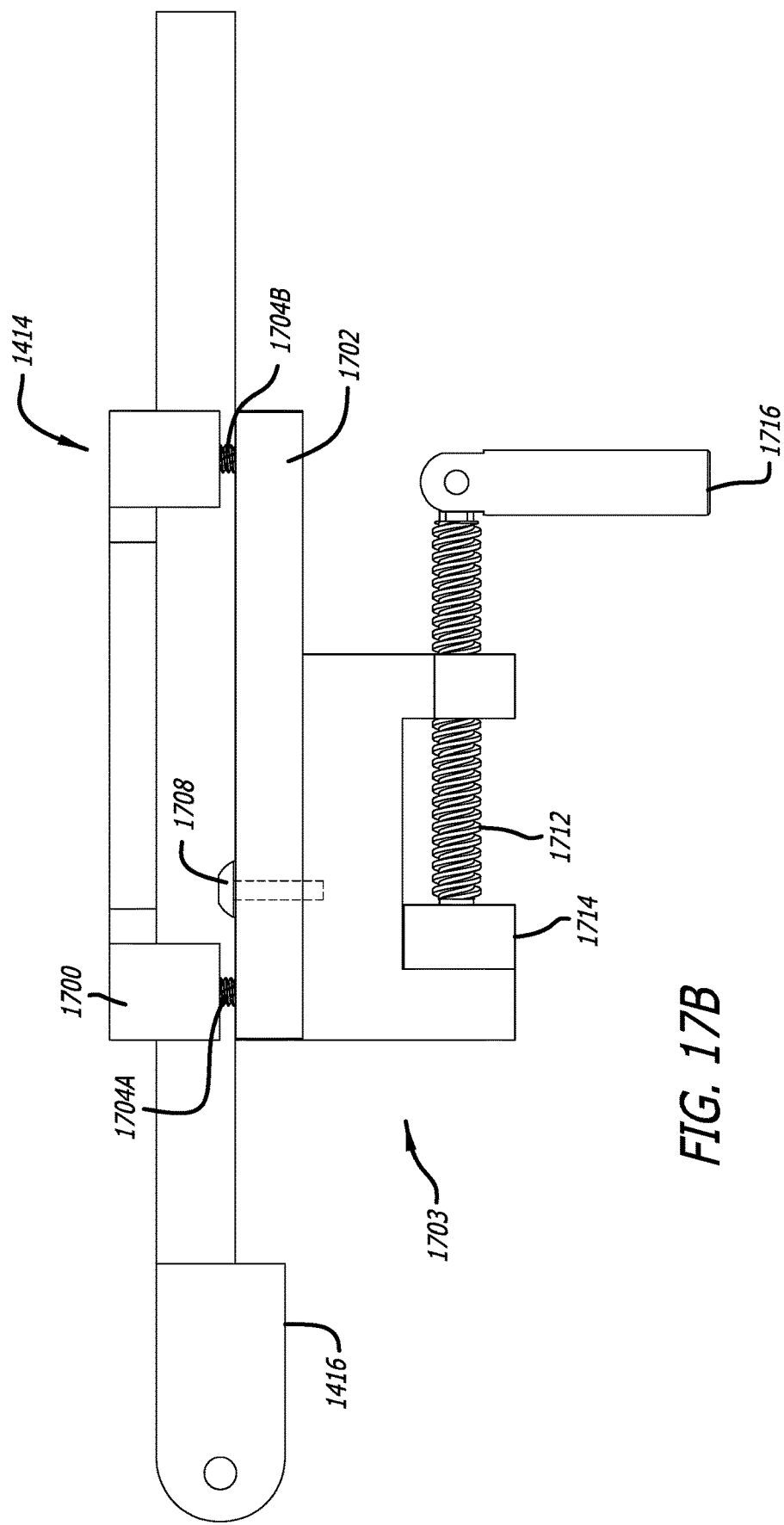
FIG. 17B is a right-side view of the wire puller vise of FIG. 17A.

The vise plate 1702 may include a groove 1706 configured to receive a socket cap bolt 1708 that is received by an aperture within a vise 1703 (FIG. 17B). By loosening the socket cap bolt 1708, the vise plate 1702 may be rotated. Tightening the socket cap bolt 1708 secures the vise plate 1702 and prevents further rotation.

Referring to FIG. 17B, a right-side view of the wire puller vise of FIG. 17A is shown. The vise plate 1702 is coupled to the vise 1703 via the socket cap bolt 1708. The vise 1703 includes a cavity for coupling to, for example, an edge of a conduit such as a pipe or electrical cabinet such that the abutment 1714 may be tightened thereby securing the wire puller vise 1414 to the edge. The threaded stud 1712 may be rotated via the screw key 1716 to move the abutment 1714 and tighten or loosen the grip of the vise 1703.

Figure 18A:
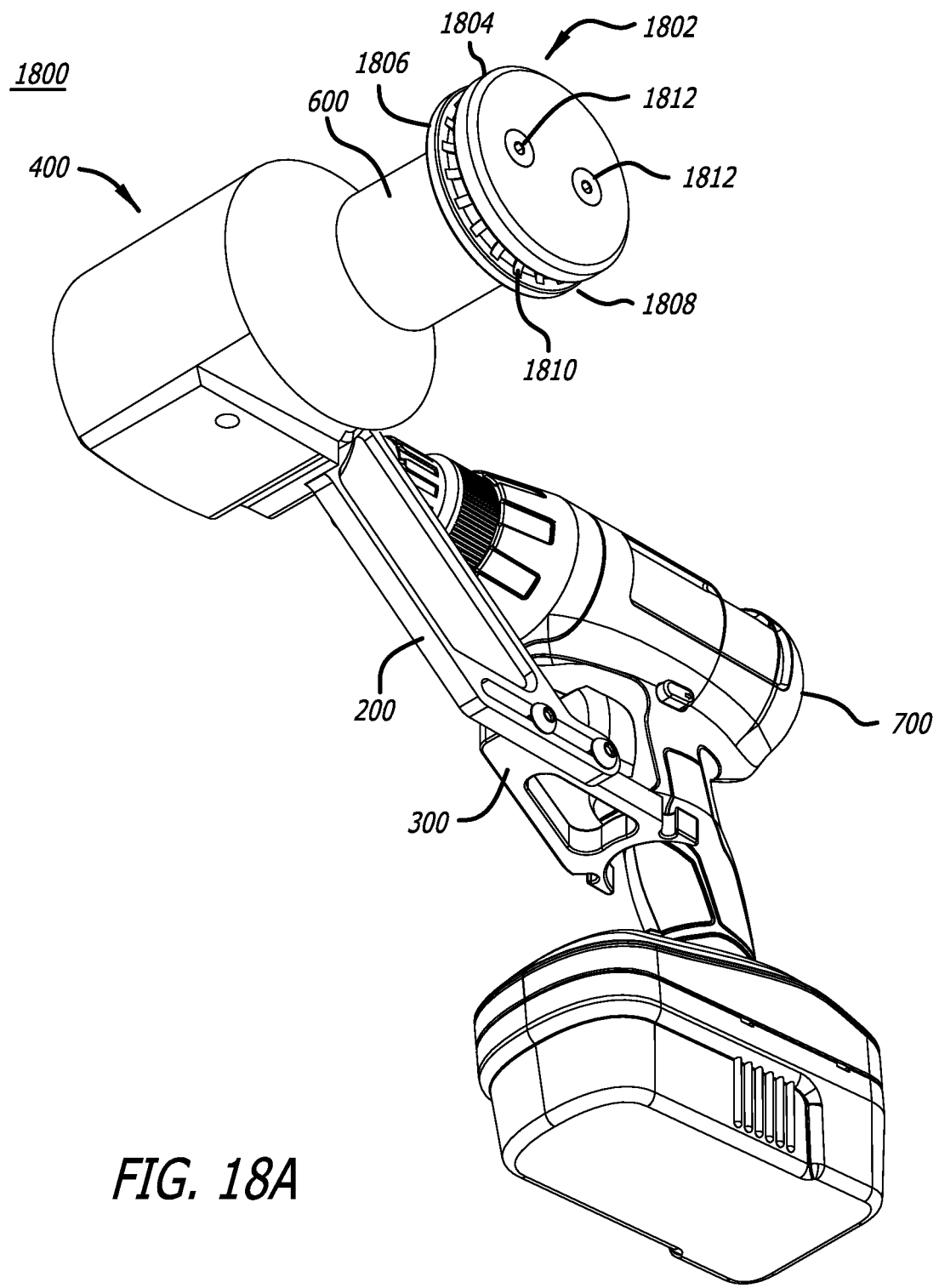
FIG. 18A is a bottom front perspective of an embodiment of a drill powered wire puller having a rope grab attachment coupled thereto.

Referring to FIG. 18A, a bottom front perspective of an embodiment of a drill powered wire puller having a rope grab attachment coupled thereto is shown. The drill powered wire puller 1800 includes the center plate 200, the trigger assembly 300, the housing 400, the capstan 600 and a rope grab attachment 1802. The housing 400 is illustrated in yet another embodiment from those discussed above with respect to shape. The housing 400 illustrated in FIG. 18A is barrel-shaped exterior including a rounded portion and at least one flat side. The at least one flat side couples with the capstan 600 on a lateral side of the housing 400. Further, the rope grab 1802 couples with the capstan 600 opposite the housing 400.

The rope grab 1802 is illustrated as having a circular shape and including an exterior side 1804 and an interior side 1806 separated by a groove 1808. The groove 1808 may include a plurality of interior facing protrusions 1810. In the illustrated embodiment, the rope grab attachment 1802 may have a circumference greater than the circumference of the capstan 600.

The rope grab attachment 1802 may couple to the capstan 600 via any fastening mechanism that enables the rope grab attachment 1802 to rotate in concert with the capstan 600. As one example, the rope grab attachment 1802 may be coupled to the capstan 600 through one or more socket cap bolts 1812. However, alternative fasteners may be utilized including a twistlock mechanism, a push-push lock mechanism, a threaded screw coupling, etc.

As discussed above, the capstan 600 is configured to receive a rope and upon rotation, wind the rope around the width of portion of the capstan 600 that extends laterally away from the center plate 200. In some instances, when rotation of the capstan 600 is stopped, the tension on the rope causes the rope to unwind from the capstan 600 negating the work performed by the drill powered wire puller 1800 to wind the rope.

To provide added functionality that secures the rope even upon the stoppage of rotation of the capstan 600, the rope grab attachment 1802 receives the rope following at least an initial winding around the capstan 600. The plurality of interior facing protrusions 1810 grip the rope and provide friction in order to hold the rope taught regardless of whether the capstan 600 is rotating.

Figure 18B:
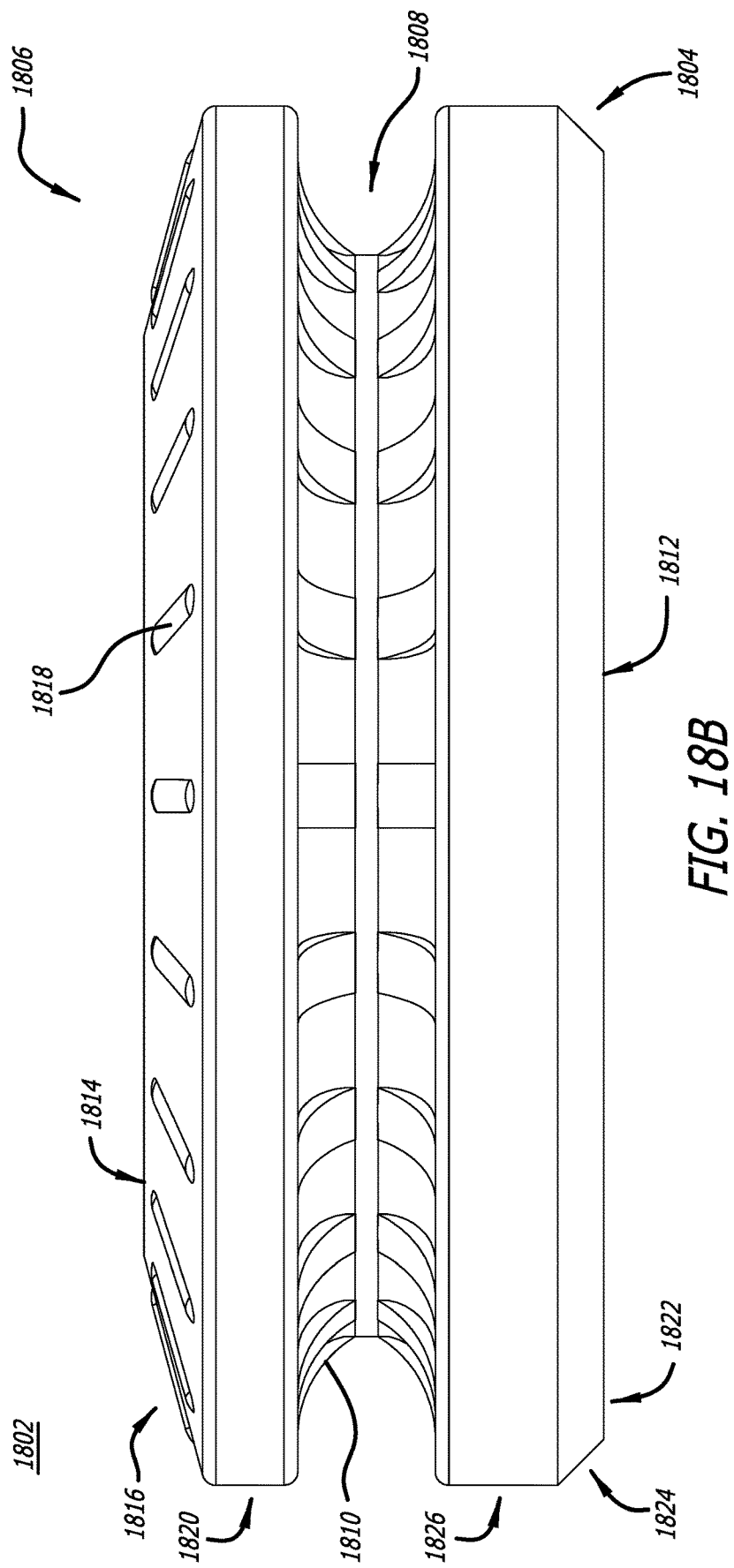
FIG. 18B is a side view of the rope grab attachment of FIG. 18A.

Referring now to FIG. 18B, a side view of the rope grab attachment of FIG. 18A is shown. The plurality of interior facing protrusions 1810 are each shown to have a uniform size and separated uniformly along the interior circumference of the groove 1808. However, in other embodiments, the plurality of interior facing protrusions 1810 may vary in sizing and need not be uniformly distributed along the interior circumference of the groove 1808.

The interior side 1806 may include a lateral flat side 1814 opposite the groove 1808, a sloped side 1816 that widens from the lateral flat side 1814 to a flat apex 1820. The interior side of the flat apex 1820 is adjacent to the groove 1808. The exterior side 1804 may include a lateral flat side 1822 opposite the groove 1808, a sloped side 1824 that widens from the lateral flat side 1822 to a flat apex 1826. The interior side of the flat apex 1826 is adjacent to the groove 1808.

Further in the embodiment illustrated, the sloped slide 1816 of the interior side 1806 may include a plurality of protrusions 1818 that protrude opposite the groove 1808. Such protrusions may assist in keeping the rope taught upon stoppage of rotation of the capstan 600.

However, in other embodiments, the exterior side 1804 and the interior side 1806 may be shaped differently. For example, one or more of the exterior side 1804 and the interior side 1806 need not include a sloped side 1816, 1824. Although the illustration of FIG. 18B shows one or more aspects of the interior side 1806 being larger than corresponding aspects of the exterior side 1804, in some embodiments, the exterior side 1804 and the interior side 1806 may include the same dimensions.

Referring to FIG. 19A, a perspective view of a support arm configured for coupling with a drill powered wire puller and a tube clamp is shown. Although not illustrated for purposes of clarity, a proximal end 1910 of the support arm 1900 may couple with the wire puller vise 1414 in a similar manner as the support arm 1416 as illustrated in FIGS. 14A-15 and 17A-17B. In other embodiments, the proximal end 1910 of the support arm 1900 may couple with a receiver such as the receiver 550 in a similar manner as the support arm 800 of FIGS. 1A, 1B, 2-4, 6-10A and 13. The support arm 1900 may be configured for various uses similar to those of the support arms 800, 1416 including supporting any of the drill powered wire pullers 100, 1400, 1500 and 1800 against a surface to counteract the resistance of the line and increase stability for the user. Support arm 1900 may also include one or more pulleys or low resistance line guides or channels for guiding the line on to the capstan 600. It should be understood that any of the support arms 800, 1416 and 1900 may be coupled to a drill powered wire puller as discussed in any of the embodiments herein.

Figure 19B:
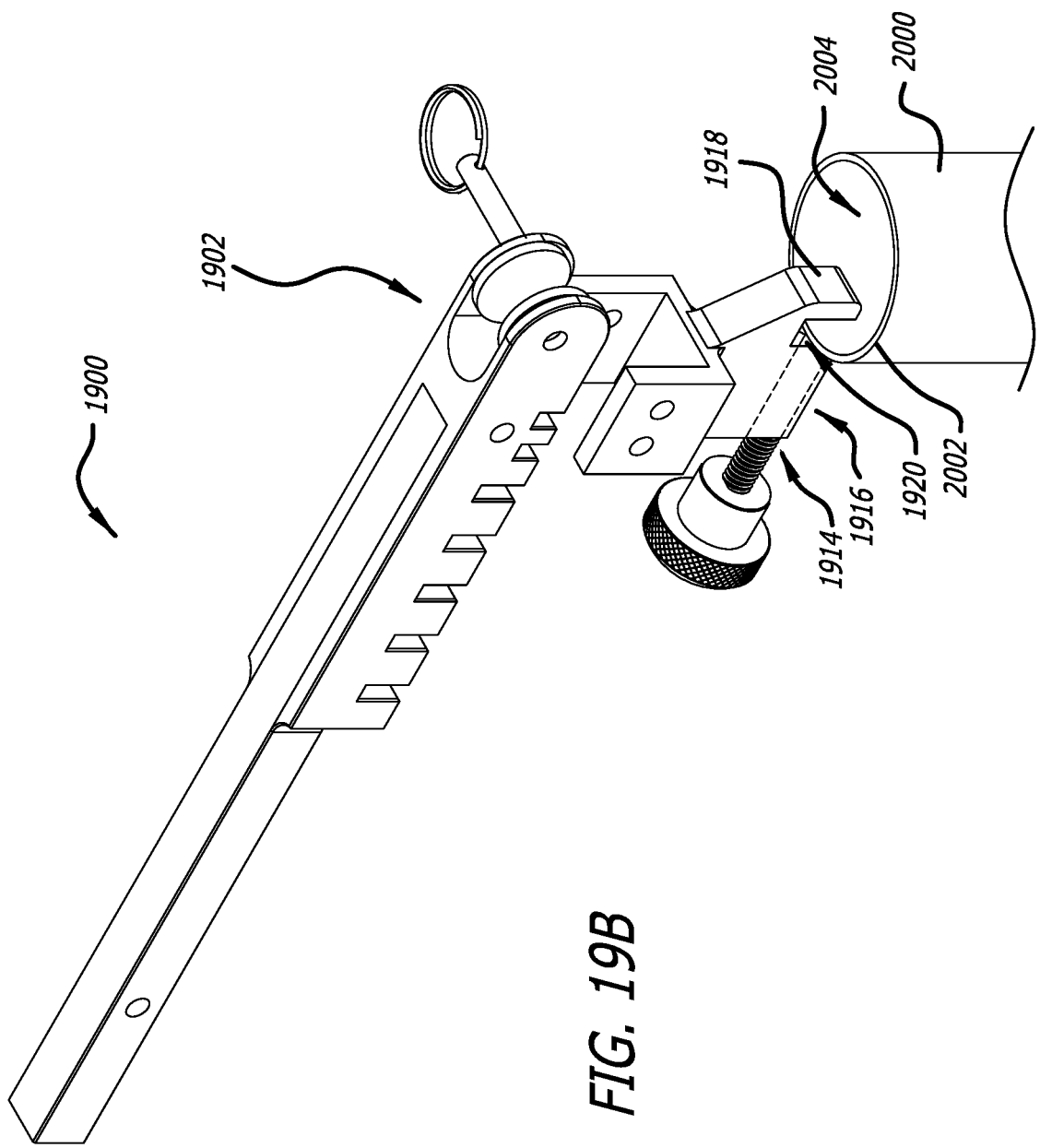
FIG. 19B is a perspective view of the support arm and the tube clamp of FIG. 19A coupled to a conduit.

As illustrated, the support arm 1900 is configured to couple with a tube clamp 1914 to provide for the ability to position the tip of the distal end 1902 of the support arm 1900 over the center of a conduit, such as the conduit 2000 of FIG. 19B. For instance, when a line is received from an opening having a small diameter, the tube clamp 1914 provides an advantageous tool for securely positioning the spool 1903 of the support arm 1900 over the center of the opening. Additionally, as will be discussed below, the support arm 1900 is also configured to couple directly to an edge or lip via the notched underside 1904.

The support arm 1900 includes the proximal end 1910, a distal end 1902, and the notched underside 1904 comprised of a plurality of notches 1906. As illustrated, the notches 1906 may vary in size. The proximal end 1910 of the support arm 1900 may include an aperture 1912 for coupling with the receiver 550 or the center plate 200 as discussed above. The support arm 1900 further includes one or more apertures 1908, typically located at the distal end 1902, that are configured to receive a securement pin 1932 for coupling to the tube clamp 1914. As is further shown in FIG. 19A, in an embodiment of the disclosure, the support arm 1900 includes a spool 1903 disposed at the distal end 1902; however, such may be disposed anywhere along the length of the support arm 1900. The spool 1903 can be configured to receive the line from a source that is positioned at an angle to longitudinal axis of a drill powered wire puller. The spool 1903 can then direct the line onto the capstan 600.

The support arm 1900 may be formed as a single piece from milled aluminum or similarly suitable material, as discussed herein, or as a plurality of pieces each formed from such as material. The support arm can extend distally along a longitudinal axis. In an embodiment the support arm extends between 6" and 36" from the distal most point of the receiver 550 or center plate 200 with a preferred embodiment extending substantially 18" from the distal most point of the receiver 550 or center plate 200. Advantageously, the support arm 1900 can be configured to provide a support footing rigidly coupled with the drill powered wire puller 100 that can be position proximate the source of the line being pulled, without impeding the travel path for the line in a similar manner as discussed above with respect to the support arms 810, 820, etc.

The tube clamp 1914 includes a bottom body component 1916, a tube clamp lip 1918, a notch 1920 to receive a conduit lip, other edge or other lip (cumulatively "lip"), a sloped body front 1922, an upper winged component 1924, two wings 1926A-1926B that extend from the upper winged component 1924, a plate 1928 to receive the distal end 1902 of the support arm 1900 and apertures 1930A-1930B to receive the securement pin 1932. The apertures 1930A-1930B refer to apertures in both of the wings 1926A-1926B of the tube clamp 1914.

Referring to FIG. 19B, a perspective view of the support arm and the tube clamp of FIG. 19A coupled to a conduit is shown. The tube clamp 1914 couples with a conduit or other edge as the notch 1920 receives the lip of the conduit or edge. To secure the tube clamp to the lip, a screw key 1934 is received by a threaded aperture 1936 and tightened such that the pressure applied by the screw key 1934 secures the tube clamp 1914 to the lip.

The support arm 1900 couples to the tube clamp 1914 as the securement pin 1932 passes through an aperture 1908 of the support arm 1900 and an aperture 1930A-1930B of the tube clamp 1914 creating a secure coupling. The securement pin 1932 may include a pull ring, and a ball detent, pin detent or similar mechanism that secures the securing pin 1932 within the securing apertures 1908, 1930A-1930B. This quick release securement pin facilitates exchange of different support arms and allows for increased efficiency and ease of use. It should be understood that either of the support arm 1900 or the tube clamp 1914 may include less or more apertures than those illustrated.

As is referenced above, the support arm 1900 includes a notched underside 1904 comprised of the plurality of notches 1906 enabling the support arm 1900 to mount directly to a lip to maintain positioning of the support arm 1900. A user can adjust the orientation of the support arm 1900 so that the notches 1906 face upward or in either lateral direction thereby enabling the drill powered wire puller 1800 to receive a line from any direction relative to the drill powered wire puller 1800.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A drill powered wire puller, comprising:
    a capstan;
    a housing coupled to the capstan, the housing including a gear mechanism disposed therein;
    a trigger assembly coupled to a trigger of a handheld power drill, wherein actuation of the trigger assembly causes depression of the trigger thereby activating the handheld power drill; and
    a foot pedal system including a foot pedal, a base, and a spring, wherein responsive to apply pressure to the foot pedal, the trigger assembly is actuated to activate the handheld power drill.

2. The drill powered wire puller of claim 1, further comprising:
    a cradle plate including a notch positioned at a proximal end of the cradle plate, the notch being sized and shaped to receive the handheld power drill.

3. The drill powered wire puller of claim 1, wherein the trigger assembly includes a trigger actuator having a first end and a second end, the first end including a receptor configured to receive an end of a throttle cable.

4. The drill powered wire puller of claim 3, wherein the trigger assembly further includes a body coupled to the trigger actuator at an axis of rotation for the trigger actuator.

5. The drill powered wire puller of claim 1, further comprising:
a support arm interposed between the capstan and the housing.

6. The drill powered wire puller of claim 5, wherein the support arm includes a plurality of notches, wherein each of the plurality of notches is configured to receive a lip or edge.

7. The drill powered wire puller of claim 5, further comprising:
a tube clamp configured to couple with (i) a lip of a conduit, and (ii) a distal portion of the support arm.

8. The drill powered wire puller of claim 7, wherein the tube clamp includes an aperture configured to receive a screw key that upon tightening secures the tube clamp to the lip of the conduit.

9. The drill powered wire puller of claim 1 further comprising:
a center plate coupled to the housing; and
a wire puller vise coupled to the center plate.

10. A drill powered wire puller comprising:
a capstan;
a housing coupled to the capstan, the housing including a gear mechanism disposed therein;
a trigger assembly coupled to a trigger of a handheld power drill, wherein actuation of the trigger assembly causes depression of the trigger thereby activating the handheld power drill;
a wireless transceiver configured to couple with the trigger assembly; and
a wireless remote configured to transmit a signal, wherein the wireless transceiver receives the signal and provides the signal to the trigger assembly causing actuation of the trigger assembly and activation of the handheld power drill.

11. The drill powered wire puller of claim 10, wherein the trigger assembly includes a system on chip (SOC) and a motor, wherein the SOC is configured to receive the signal and cause actuation of the motor resulting in rotation of a trigger actuator and activation of the handheld power drill.

12. A drill powered wire puller comprising:
a capstan;
a housing coupled to the capstan, the housing including a gear mechanism disposed therein;
a trigger assembly coupled to a trigger of a handheld power drill, wherein actuation of the trigger assembly causes depression of the trigger thereby activating the handheld power drill; and
a support arm interposed between the capstan and the housing; and
a tube clamp configured to couple with (i) a lip of a conduit, and (ii) a distal portion of the support arm,
wherein the tube clamp includes a notch to receive the lip of the conduit, an upper winged component, a plurality of wings extending from the upper winged component and a plate to receive the distal portion of the support arm.

13. The drill powered wire puller of claim 12, wherein the tube clamp and the support arm each include an aperture configured to receive a securement pin thereby coupling the support arm to the tube clamp.

14. The drill powered wire puller of claim 12, wherein the tube clamp includes an aperture configured to receive a screw key that upon tightening secures the tube clamp to the lip of the conduit.

15. A drill powered wire puller comprising:
a capstan;
a housing coupled to the capstan, the housing including a gear mechanism disposed therein;
a trigger assembly coupled to a trigger of a handheld power drill, wherein actuation of the trigger assembly causes depression of the trigger thereby activating the handheld power drill; and
a rope grab attachment configured to couple to the capstan and grip a line that has been at least partially wound around the capstan, wherein the rope grab attachment includes an interior side and an exterior side separated by a groove to receive the line and the groove includes a plurality of protrusions that grip the line.

* * * * *